US011989987B2

(12) United States Patent
Bos

(10) Patent No.: US 11,989,987 B2
(45) Date of Patent: May 21, 2024

(54) LOCK AND METHOD FOR OPERATING SAME

(71) Applicant: BAUER PRODUCTS, INC., Grand Rapids, MI (US)

(72) Inventor: Robert G. Bos, Grand Haven, MI (US)

(73) Assignee: BAUER PRODUCTS, INC., Grand Rapids, MI (US)

( * ) Notice: Subject to any disclaimer, the term of this patent is extended or adjusted under 35 U.S.C. 154(b) by 0 days.

(21) Appl. No.: 17/823,861

(22) Filed: Aug. 31, 2022

(65) Prior Publication Data

US 2023/0069249 A1 Mar. 2, 2023

Related U.S. Application Data

(60) Provisional application No. 63/239,176, filed on Aug. 31, 2021.

(51) Int. Cl.

| | |
|---|---|
| ***G07C 9/00*** | (2020.01) |
| ***E05B 47/00*** | (2006.01) |
| ***E05B 47/06*** | (2006.01) |
| ***G07C 9/20*** | (2020.01) |

(52) U.S. Cl.

CPC ...... *G07C 9/00309* (2013.01); *E05B 47/0012* (2013.01); *E05B 47/0603* (2013.01); *G07C 9/00658* (2013.01); *G07C 9/20* (2020.01); *G07C 2009/00325* (2013.01)

(58) Field of Classification Search

None

See application file for complete search history.

(56) References Cited

U.S. PATENT DOCUMENTS

| | | | | |
|---|---|---|---|---|
| 6,552,649 | B1 | 4/2003 | Okada et al. | |
| 8,126,450 | B2 | 2/2012 | Howarter et al. | |
| 9,007,173 | B2 | 4/2015 | McIntyre et al. | |
| 9,406,178 | B2 | 8/2016 | Pukari | |
| 9,691,201 | B2 | 6/2017 | Myers et al. | |
| 9,978,195 | B2 | 5/2018 | Handville et al. | |
| 10,202,785 | B2 | 2/2019 | Overgaard | |
| 10,232,823 | B1 * | 3/2019 | Bobay | B60R 25/33 |
| 10,249,122 | B1 | 4/2019 | Aksamít et al. | |
| 10,360,743 | B2 | 7/2019 | Ahearn et al. | |
| 10,654,446 | B2 | 5/2020 | Golsch | |
| 10,683,677 | B1 | 6/2020 | Funamura et al. | |
| 2005/0165979 | A1 * | 7/2005 | Kato | G06F 9/44505 710/15 |
| 2013/0027180 | A1 | 1/2013 | Lakamraju et al. | |
| 2014/0028440 | A1 | 1/2014 | Takeuchi et al. | |
| 2015/0048927 | A1 | 2/2015 | Simmons | |

(Continued)

FOREIGN PATENT DOCUMENTS

| | | | |
|---|---|---|---|
| GB | 2417858 | A | 3/2006 |
| KR | 101861057 | B1 | 5/2018 |
| KR | 20200017247 | A | 2/2020 |

*Primary Examiner* — Carlos Garcia

(74) *Attorney, Agent, or Firm* — Greer, Burns & Crain, Ltd

(57) ABSTRACT

A method for operating a lock. A wireless command is received from a trusted device in a proximity range of the lock to enable a proximity mode. The proximity range is selectable by a user of the trusted device via an application. The proximity mode is enabled, and while enabled, a command is received to activate or deactivate the lock. The lock is activated or deactivated in response to the received activating or deactivating command.

20 Claims, 20 Drawing Sheets

(56) References Cited

U.S. PATENT DOCUMENTS

| | | | |
|---|---|---|---|
| 2015/0204112 | A1 | 7/2015 | Salzmann et al. |
| 2015/0292244 | A1 | 10/2015 | Beatty |
| 2016/0231421 | A1 * | 8/2016 | Murakami .............. G01S 11/06 |
| 2017/0243420 | A1 | 8/2017 | Lien |
| 2018/0016810 | A1 | 1/2018 | Bacon et al. |
| 2018/0328079 | A1 * | 11/2018 | Lim ...................... E05B 45/005 |
| 2019/0061692 | A1 * | 2/2019 | Bobay ..................... B60R 25/33 |
| 2019/0136580 | A1 | 5/2019 | Blust et al. |
| 2019/0218826 | A1 | 7/2019 | Allen et al. |
| 2022/0030384 | A1 * | 1/2022 | Hasegawa ............. H04W 4/023 |
| 2023/0039052 | A1 * | 2/2023 | Shimizu ............. G07C 9/00944 |

* cited by examiner

1000

1200

1600

1700

1800

LOCK AND METHOD FOR OPERATING SAME

PRIORITY CLAIM

This application claims priority to and benefit from U.S. Provisional Patent Application Ser. No. 63/239,176, filed Aug. 31, 2021, which application is incorporated in its entirety by reference herein.

FIELD

The present disclosure relates generally to lock assemblies (locks) for movable closures and the like, and in particular to an intelligent lock that can be actuated in part using a trusted device that is within a selectable proximity of the lock.

BACKGROUND

Lock assemblies (locks) are generally well-known in the art. Locks are typically flush mounted on an associated closure (such as but not limited to a door closure) to facilitate selectively shifting the closure between an open, unlocked position and a closed, locked position.

It is useful for locks to be accessible and operable at least partially in a keyless, remote manner for convenience and security. However, it is important for remote operation to avoid unauthorized activation and deactivation.

To this end, intelligent remotely activated locks have become more commonly used in the art that allow a user to activate or deactivate the lock using authorized portable items such as key fobs, badges, etc. Such authorized items allow a user to activate or deactivate the lock wirelessly using a device that is near the lock using a simple manual operation (such as pressing a button on the key fob) or by merely locating the item in the lock's range, without further operation required.

However, there is a tradeoff between, on the one hand, reducing the burden on the user of an authorized item to activate or deactivate the lock, and on the other hand, avoiding unintentional activation or deactivation of the lock, or activation or deactivation of the lock using an unauthorized device. Existing remotely activated locks have not been suitably adaptable or configurable to optimize such tradeoffs based on particular user needs or environments.

SUMMARY

There is a need for an intelligent lock that can be actuated using one or more trusted portable devices when the trusted portable devices come into a selectable range of the lock.

There is a further need for an intelligent lock that is simple for a user to activate or deactivate while avoiding unintentional activation or deactivation from the user, and while avoiding activation or deactivation using an untrusted device.

There is a further need for an intelligent lock having an operation that is at least partially configurable via the trusted portable devices.

There is a further need for an intelligent lock that can track the one or more trusted devices and/or the locks' locking or unlocking history using such trusted portable devices.

Embodiments provide, among other things, an intelligent lock that senses, using wireless communication (Bluetooth, Bluetooth LE, etc.) via a wireless antenna, the presence of one or more trusted interactive portable devices (such as smartphones, smart wearables, etc.), referred to herein as trusted devices, that are within a selectable short range or zone of the lock. Trusted devices are devices that have been securely paired to the lock and are associated with the lock, e.g., via a device identifier or ID that is stored in a memory of, or otherwise accessible to, the lock. If the lock is associated with a trusted device, the lock in turn can be considered a trusted lock for that trusted device. A proximity mode can be selected using the trusted device, and in the proximity mode the user can activate or deactivate the lock by interfacing with a portion of the lock, such as by touching a surface of the lock or touching a button on the lock's keypad or touch pad, e.g., providing a one-touch unlock. One or more additional commands can optionally be sent from the trusted device while in proximity of the lock for operating one or more functions of the lock. Locks can be used for and installed in various closures, including but not limited to building doors, vehicle doors, cabinets, portable articles, etc.

The size of the zone within which proximity mode takes place for a particular trusted device (which can be defined, for instance, by wireless signal strength between the lock and the trusted device) can be individually configurable/definable by the user, e.g., by using an application (app) executed by a processor and memory in the trusted device. Each trusted device paired to the lock can thus be associated with a selectable zone boundary around the lock. It will be appreciated that functions may be provided via a single app or multiple apps, and as such the use herein of "app" can refer to single or multiple apps that may be provided on the trusted device for various functions.

In embodiments, this zone can be made more precise by providing a radiofrequency (RF) shield such as a Faraday shield for the wireless antenna of the lock. This can improve wireless communication and the configurability of the zone.

In embodiments, the lock includes an indicator for notifying a user of a trusted device that the trusted device is within the selected zone or range and that the proximity mode is enabled. This lets the user know that the proximity mode commands are available. Example indicators that may be in or on the lock (e.g., on a housing of the lock, or viewable through a housing) include an illuminator such as a light (e.g., a light-emitting diode (LED) or other suitable light, which may be steady or blinking in one or more patterns), audio device (e.g., sound chip or speaker), signal generator (e.g., for sending a notification signal to a specific trusted device).

In embodiments, the user can activate/deactivate a proximity mode for the lock using the app. When the proximity mode has been activated for the lock, and the lock detects that a trusted device is within the defined zone, the lock enables the capability of one or more functions that are set within the app, such as unlocking the lock from a user touching a button or a surface on the lock's keypad or touch pad. In some embodiments, unlocking the lock can be in response to a single action (e.g., touching the lock surface, touching a keypad or touch pad, touching a single icon, pressing a single button, etc.), though multiple command actions may be used in other embodiments. If detection mode is not activated, or if no trusted device is within the defined zone (that is, either no device is within the zone or only devices that are not trusted are within the zone) the lock can disable the functions.

Each trusted device can be assigned a secure ID (e.g., a unique ID not generally known) that is accessible by the lock so that the trusted device is associated with the secure ID by the lock. Secure IDs may be in any form. In embodiments, the secure ID is stored in a suitable memory in the lock.

Embodiments herein further provide systems and methods for operating a lock. The lock can be configured using processor-executable instructions for operating the mechanical elements of the lock and for communicating with one or more trusted devices. The lock can be configured to detect that the trusted device is within a zone (or range, or proximity) of the lock that is configurable, to authenticate the trusted device as authorized, and to, while the trusted device is within the zone of the lock, open the lock at least partly in response to a user of the trusted device interfacing with the lock and/or at least partly in response to a signal from the trusted device, where this signal is in response to the user operating an app on the trusted device.

Other features and advantages of the invention will be apparent from the following specification taken in conjunction with the following figures.

BRIEF DESCRIPTION OF THE DRAWINGS

The present disclosure will become more fully understood from the detailed description and the accompanying figures, wherein.

DETAILED DESCRIPTION

Figure 1:
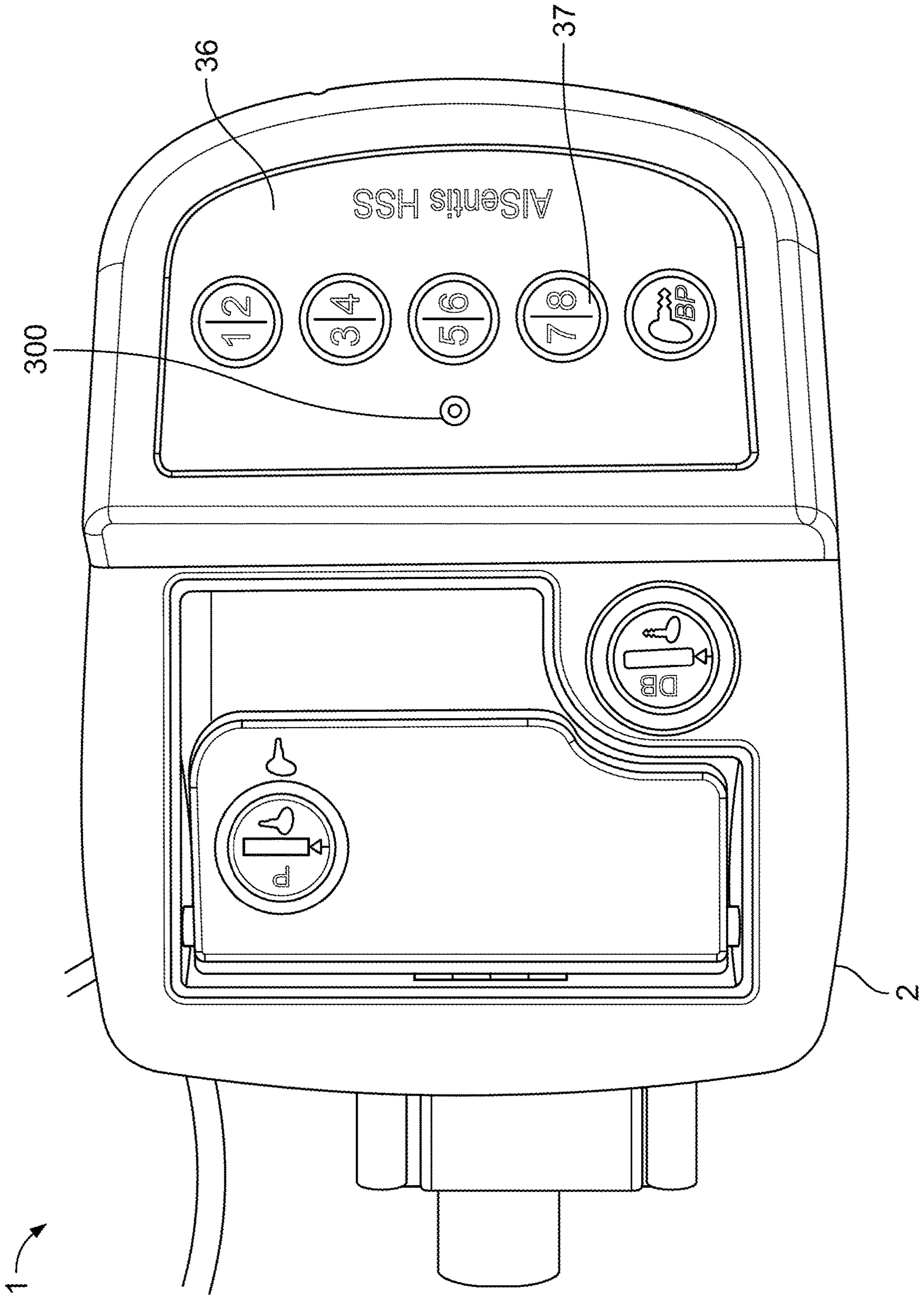
FIG. 1 is an elevation view of an example lock.

While this invention is susceptible of embodiments in many different forms, there is shown in the drawing and will herein be described in detail preferred embodiments of the invention with the understanding that the present disclosure is to be considered as an exemplification of the principles of the invention and is not intended to limit the broad aspects of the invention to the embodiments illustrated.

Referring now to FIGS. 1-2 and 3A-3B, a lock assembly (lock) 1 is generally designated having a housing 2 adapted for mounting in or adjacent to an associated closure 3 of the type that can be shifted between an open position (shown in FIG. 2) and a closed position. Example mechanical configurations and components for the lock 1 are disclosed in commonly-owned application Ser. No. 15/716,571, filed Sep. 27, 2017, entitled TOUCH PAD LOCK ASSEMBLY WITH CLUTCH SYSTEM, and published in U.S. Patent Pub. No. 2018/0016810, the entire disclosure of which is incorporated by reference herein.

In the example lock 1, a paddle handle 4 is pivotally mounted in an exterior portion of the housing 2 for rotation between a retracted position and an extended position (FIG. 1 shows an example extended position). A latch plunger 5 is operably connected with the paddle handle 4, and configured such that when the paddle handle is in the retracted position, the latch plunger is in a latched position, wherein the closure 3 cannot be unintentionally shifted from the closed position, and when the paddle handle 4 is in the extended position, the latch plunger is in an unlatched position, wherein the closure 3 is free to be shifted from the closed position to the open position.

A paddle handle key lock 6 can be mounted on the exterior portion of the paddle handle 4, and may include a movable key lock member 7 that is selectively movable between a locked position and an unlocked position. A paddle handle lock pawl 8 is movably mounted in the paddle handle 4, operably connected with the movable key lock member, and configured such that when the movable key lock member 7 is in the locked position, the paddle handle lock pawl 8 engages a paddle handle recess stop (not shown) in which the paddle handle 4 can be retained in the retracted position. When the movable key lock member 7 is in the unlocked position, the paddle handle lock pawl 8 may assume an unlocked position in which the paddle handle 4 is free to be shifted between the retracted and the extended positions.

A deadbolt key lock 10 may be mounted in the housing 2 for shifting between a locked position, wherein the closure is positively retained in the closed position, and an unlocked position, wherein the closure is free to be shifted between the open and the closed positions. The key lock 6 may be but need not be substantially identical to the deadbolt key lock 10. The deadbolt key lock 10 may include a movable deadbolt key lock member 12, such that the movement of the movable deadbolt key lock member 12 between the locked and unlocked positions contemporaneously shifts the deadbolt key lock 10 between the locked and unlocked positions.

Figure 2:
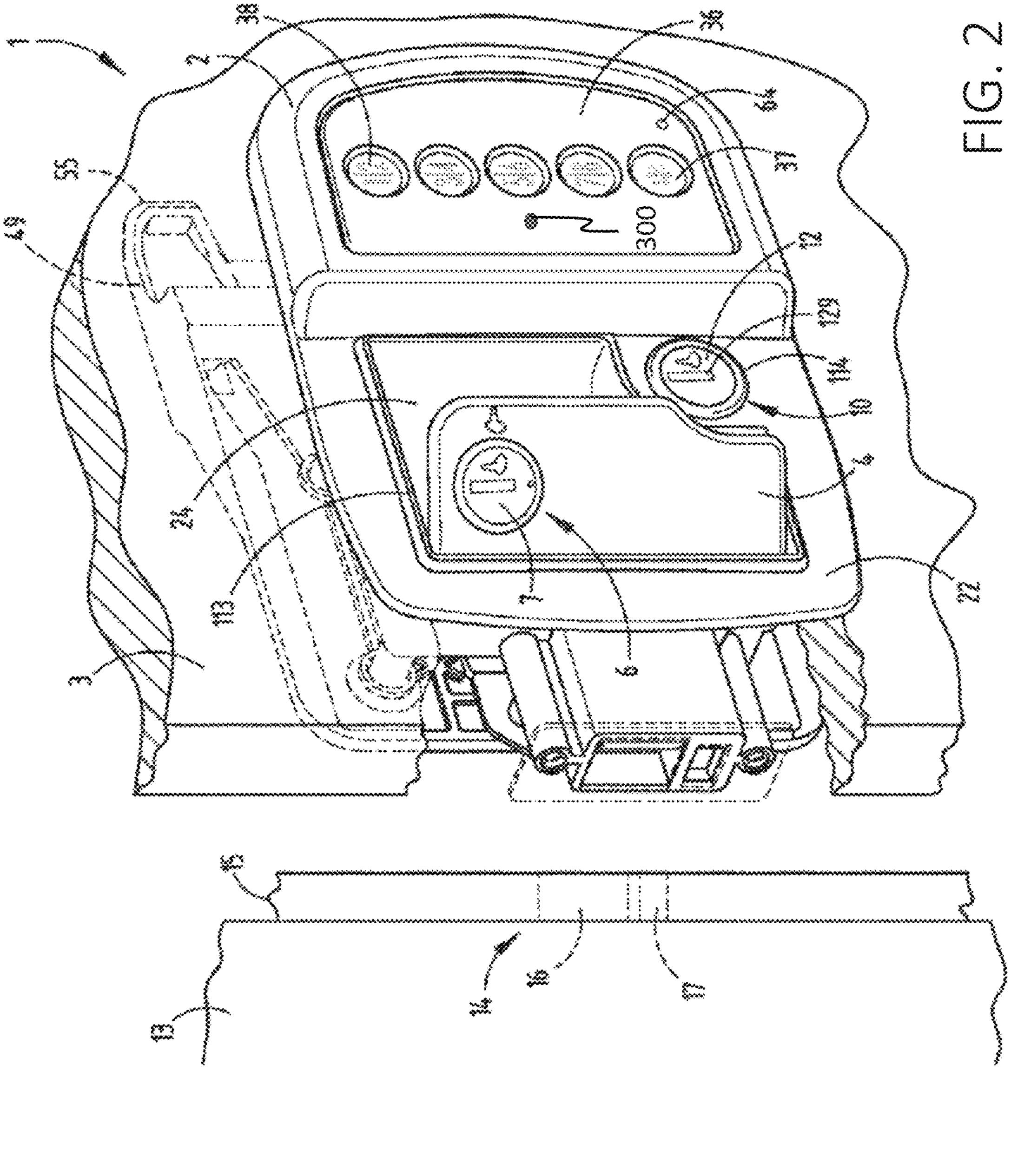
FIG. 2 is a perspective view of the example lock of FIG. 1 mounted in an associated closure.

In the example arrangement in FIG. 2, the closure 3 in which the lock 1 is mounted can be provided by, as non-limiting examples, an entry door for a recreational vehicle, motor home, trailer, shed, or the like, which can be pivotally shifted between open and closed positions along a substantially vertical (in the orientation shown in FIG. 2) hinge axis. It will be appreciated, however, that these are merely example, and the lock 1 may be mounted in other closures, including but not limited to those described herein. The closure 3 selectively engages an associated doorframe 13 (for example) having a jamb section 14 in which a door strike 15 is mounted. The door strike 15 includes horizontally extending recesses 16, 17 extending into the jamb section 14 in which an associated portion of the latch plunger 5 and a deadbolt 80 (FIG. 3) engages and disengages, respectively, to selectively retain the closure 3 in a fully closed position. It will be appreciated that recesses 16, 17 can be combined into a single recess.

Figure 3A:
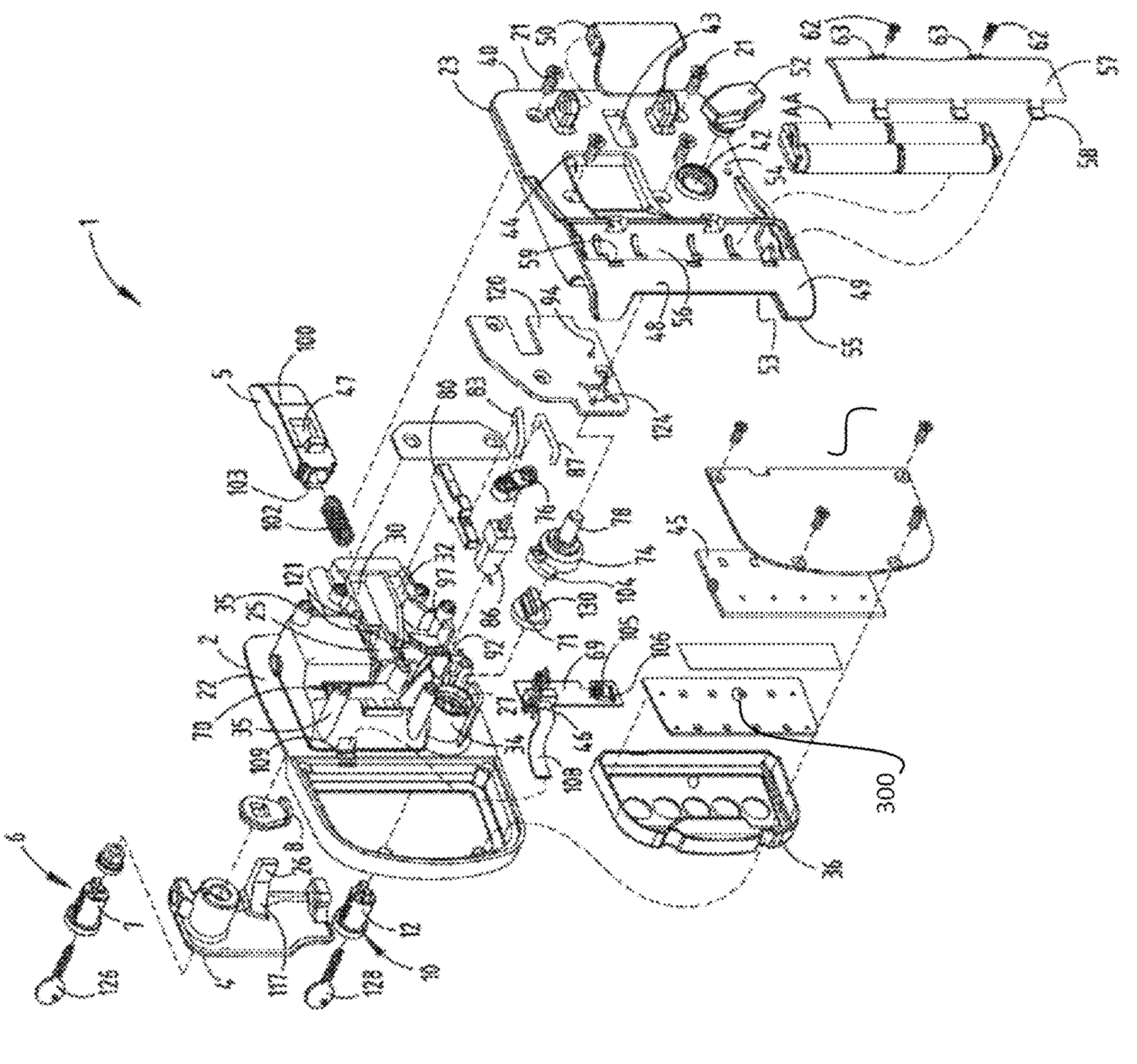
FIGS. 3A-3B are exploded perspective views of the lock of FIG. 1, taken from interior and exterior sides thereof, respectively.
Figure 3B:
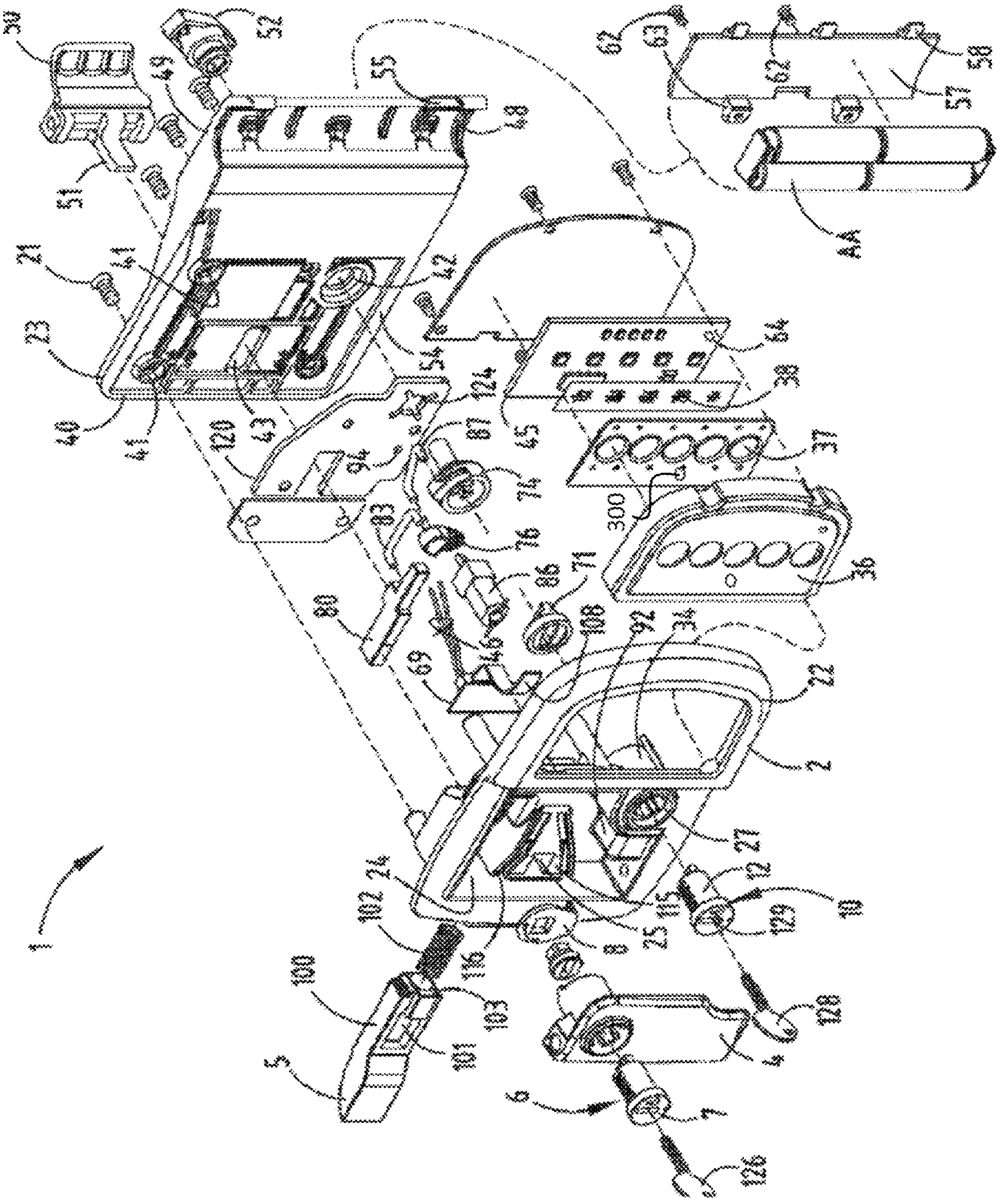

As shown in FIG. 3A-3B, the housing 2 may have a multi-part (e.g., two-part) construction, including an exterior housing plate 22, in which the paddle handle 4 is pivotally mounted, and an interior housing plate 23, which can mount on the interior of the closure 3 and is attached to the exterior housing plate 22 by fasteners 21. The illustrated exterior housing plate 22 includes a centrally disposed, bowl-shaped paddle handle recess 24 located directly behind the paddle handle 4, which provided finger access to facilitation rotation of the paddle handle 4 between the retracted and extended positions. The bottom wall of the paddle handle recess 24 includes an actuator window 25 though which an actuator tab 26 on the paddle handle 4 extends to operate the latch plunger 5, and also includes on a marginal portion the paddle handle recess 24. The marginal portion of the exterior housing plate 22 includes a lock aperture 27 on which the deadbolt key lock 10 is mounted. A computer input device, such as touch pad 36, which may include a plurality of buttons 37, each of which may include indicia (numerals or other symbols, for instance) thereon, e.g., as shown in FIG. 2, is located on the exterior of the exterior housing plate 22 and can be used to actuate the lock 1.

The inside surface of the exterior housing plate 22 may include a centrally disposed, horizontally extending plunger slide channel 30 and a horizontally extending deadbolt lock slide channel 32 disposed vertically below the latch plunger slide channel for mounting therein associated portions of the lock, examples of which are illustrated in U.S. Pat. Pub. 2018/0016810. The inside surface of the exterior housing plate 22 can also include a cylindrically shaped lock boss 34, the interior of which defines a lock aperture 27, and a plurality of rearwardly projecting fastener bosses 35 which can facilitate connection of the interior housing plate 23 to the exterior housing plate 22 using fasteners 21. The insider surface of the exterior housing plate 22 also includes a processor such as a microchip or controller 45, explained in more detail below, and a motor 86.

The example interior housing plate 23 includes a marginal portion 40, which engages the interior surface of closure 3, as well as fastener bosses 41, a lock boss 42, and a centrally disposed actuator window 43, and may include a finger recess 44. A rearwardmost or interior side edge 48 of the interior housing plate 23 is contoured inwardly to define a stationary interior handle 49, which facilitates opening and closing the closure 3, e.g., from an interior portion of a vehicle. A release lever 50 can be pivotally mounted on the inner surface of the interior housing plate 23 and extend generally over the finger recess. The example release lever 50 includes a protruding actuator tab 51, which extends through actuator window 43 in the interior housing plate 23 and into an interior pocket in a slide portion 100 of the latch plunger 5 to selectively shift the same to the unlatched position. An interior lock knob 52 can be pivotally received in the lock boss 42 on the interior housing plate 23 and is operably connected with the movable key lock member 12 of the deadbolt key lock 10 to lock and unlock a deadbolt 80.

The interior handle 49 may be formed integrally with interior housing plate 23 along a rearwardmost interior side edge 48 thereof, and may include a central cutaway area 53 for finger access to facilitate shifting closure 3 between the open and closed positions. The example interior handle 49 has a flat portion 54 disposed substantially coplanar with the innermost surfaces of the release lever 50 and the lock knob 52. Furthermore, the interior handle 49 includes a downwardly angled exterior portion 55 in which the cutaway area is formed, and is disposed in an inwardly angled orientation with respect to the flat portion 54. The ramp-shaped exterior portion 55 of the interior handle 49 deflects or leads a pleated or sliding screen over the interior of the lock assembly 1, so as to avoid interference. The finger recess can achieve a low profile, while facilitating grasping and rotating the interior release lever 50.

The interior housing plate 23 can also be provided with a battery compartment 56 disposed between the interior handle 49 and the interior lock knob 52 and release lever 50. The battery compartment 56 is preferably adapted to receive a power source, for instance provided by four AA batteries AA, which are common and easy to install. A battery compartment cover 57 is removably attached to the interior housing plate 23 through tabs 58 that are received within recesses 59 on one edge of the battery compartment and fasteners 62 that secure attachment tabs 63 to the opposite edge of the battery compartment. The batteries in the battery compartment in the interior housing plate 23 are electrically coupled through suitable power lines to provide electrical power to the controller 45 and motor 86 mounted on the exterior housing plate 22.

In the illustrated example, the movable deadlock key lock member 12 of the deadbolt key lock 10 is received in the lock aperture 27 on the exterior housing plate 22, and is rotatably mounted in the lock boss 34 for rotation between locked and unlocked positions. The illustrated lock cam 74, may have a crank arm that is operably connected with the deadbolt key lock 10. The lock cam 74 may further include a cylindrically shaped base with a recessed end oriented toward the exterior housing plate 22, a stop or collar, and a faced shaft oriented toward the interior housing plate 23. A cam actuator 71 can be fitted within the recessed end and is coupled to the distal end of the deadbolt key lock member 12. The recessed end of the lock cam 74 can be provided with opposed lobes on its interior surface. The face of the cam actuator 71 facing the recessed end of the lock cam 74 can be provided with a center edge. This structure allows the rotation of the deadbolt key lock member 12 and the cam actuator 71 within the recessed end to rotate the lock cam 74, but likewise allows the lock cam 74 to rotate to a degree independent of and without the necessity of rotation of the deadbolt key lock member 12 and the cam actuator 71.

A base of the lock cam 74 can be received within the lock boss 34 and engage a recess (not shown) to positively position the lock cam 74 for rotation about its axis only. A lock cam support (not shown) can be provided at the marginal edge of the lock boss 34 to further restrain the lock cam 74 from extraneous motion. The faced shaft on the lock cam 74 extends through the lock boss 42 in the interior housing plate 23, and engages the lock knob 52 mounted on the interior end thereof, such that rotation of the lock knob 52 from the interior of the closure rotates the lock cam 74 between the locked and unlocked positions to shift the deadbolt 80 between the locked and unlocked positions, as described below.

The illustrated deadbolt key lock 10 and the lock knob 52 can be operably connected with the deadbolt 80 slidably mounted in a deadbolt lock slide channel of the exterior housing plate 22, which can include an outer end that extends exterior of the housing 2 for engagement with door strike 15, and an inner end 82, which extends interior of housing 2. A first link 83 has a first end thereof pivotally connected with an orifice provided at the inner end of deadbolt 80, and a second end thereof pivotally connected with a first orifice in a motor crank arm 76, which is, in turn, operably connected to a motor shaft extending from the motor 86 mounted to the exterior housing plate 22.

A second link 87 has a first end thereof pivotally connected with a second orifice in the motor crank arm 76 and a second end thereof pivotally connected to an orifice 73 of the crank arm of the lock cam 74, such that rotation of the motor shaft rotates the motor crank arm 76 between the locked and unlocked positions and simultaneously longitudinally shifts the deadbolt 80 between the locked and unlocked positions. Preferably, the first link 83 and the second link 87 are identical in length, height, gage, and material so as to be interchangeable, avoiding assembly error. An example motor 86 is a 6 vdc motor capable of 320-340 RPM at 6 vdc with a gear reduction of 100:1, which, due to the geometry of the linkages and along with the fact that with two separate linkages the motor 86 need only rotate 90 degrees or less, preferably less than about 80 degrees, and provides high-speed actuation capable of activating deadbolt 80 in approximately ¼ second. Alternative configurations for the lock are disclosed in U.S. Pat. Pub. 2018/0016810.

The motor 86 can be mounted in a recess pocket 92 integrally molded into the interior side of the exterior housing plate 22. The pocket 92 may be designed to prevent water pooling proximate the motor 86. The pocket 92 may securely contain the motor 86 from misalignment and provides ease of assembly because the motor 86 is simply slid into the pocket 92. An interconnect board 69, into which the battery power line 46 is connected via a plug, provides power to the touch pad 36 and the motor 86 via wires 108 routed through wire channel 109. The interconnect board 69 may also contain one or more micro switches 105, discussed below, for indicating the locked and unlocked deadbolt 80 positions. Preferably, the interior surface of the exterior housing plate 22 incorporates a pocket for ease of location and installation of interconnect board 69.

In the illustrated lock assembly 1, an interior backer plate 120 is disposed between the exterior and interior housing plates 22 and 23, covers the interior faces of deadbolt 80 and slide portion 100, and is attached to fastener bosses 121 on the interior side of the exterior housing plate 22 to retain the moving components securely in place.

The axis of rotation of the motor crank arm 76 may be fixed by a combination of a pocket 92, discussed above, as well as a circular pad on the motor crank arm 76 and an orifice 94 in the interior backing plate 120 that holds the motor 86 in place. These features prevent the motor crank arm 76 from moving laterally, and yet allow the motor crank arm 76 to freely rotate. Preferably, the interior surface of the exterior housing plate 22 includes physical stops 96, 97 to prevent the motor crank arm 76 from over rotation and to prevent the deadbolt 80 from being forced to the unlocked position.

The example latch plunger 5 includes a slide portion 100 which is slidably mounted in the latch plunger slide channel 30 on the inside surface of the exterior housing plate 22 for laterally shifting between latched and unlatched positions. Slide portion 100 has an exterior pocket 101 into which an actuator tab 26 on paddle handle 4 is received, such that shifting paddle handle 4, e.g., from the exterior of a vehicle, between the retracted and extended positions longitudinally shifts slide portion 100 in a lateral direction between a latched position and an unlatched position. The slide portion 100 has an interior pocket 47 into which an actuator tab on a release lever is received, such that shifting the release lever 50 from the interior of the closure similarly shifts slide portion 100 between the latched and unlatched positions. A coil spring 102 is mounted in the latch plunger slide channel 30 and is abuttingly received in a centering hole in a rearward side edge 103 of slide portion 100 to urge the slide portion 100 toward the normally latched position.

In an example operation, the closure 3 can be shifted from the closed to the open position from the exterior of the vehicle (for instance) in the following manner. With the paddle handle 4 in the unlocked position via a key 126 and the deadbolt key lock 10 in the unlocked position, the paddle handle 4 may be rotated outwardly from the retracted position to the extended position. Rotation of the paddle handle 4 from the retracted position to the extended position pivots the actuator tab 26 laterally, which, in turn, moves the slide portion 100 laterally inwardly. The lateral inward shifting of the slide portion 100 causes the latch plunger 5 to shift to the unlatched position. The latch plunger 5 thereby disengages from the door strike recess 16, and permits the user to shift closure 3 from the closed position to the open position, as shown in FIG. 2.

Closure 3 can be similarly shifted from the closed position to the open position from the interior of the closure in the following manner. With the paddle handle 4 in either of the locked or unlocked positions and the deadbolt key lock 10 in the unlocked position, the release lever 50 may be rotated laterally inwardly from the retracted position to the extended position, which pivots the actuator tab 51 laterally, and moves the slide portion 100 inwardly. The inward shifting of the slide portion 100 also causes the latch plunger 5 to shift to the unlatched position. The latch plunger 5 thereby disengages from the door strike recess 16, and permits the user to shift closure 3 from the closed position to the open position.

In order to return the closure 3 to the closed and latched position from either the exterior or interior of the closure, the user can simply shift the closure 3 to the closed position, which causes an inclined surface on the latch plunger 5 to strike the door strike 15 and thereby push the latch plunger 5 into the interior of the lock 1. When the latch plunger 5 comes into registry with the door strike recess 16, the latch plunger 5 is urged back to the latched position by virtue of the spring biasing force exerted by coil spring 102, thereby preventing the door from being inadvertently shifted from the closed position to the open position. The latch plunger 5 may also have a slightly inclined surface relative its longitudinal length to provide a greater resistance to inadvertent opening of the closure 3 and more reliable engagement with the door strike recess 16, particularly when the lock assembly 1 is applied to a trailer or other mobile application subject to significant vibrations during transit.

When the closure 3 is in the fully closed and latched position, the same can be positively locked in place by rotation of deadbolt key lock member 12 or interior lock knob 52. A matching deadbolt key 128 may be inserted into the key slot 129 in the deadbolt key lock member 12, and the same are then rotated from the unlocked position to the locked position. Rotation of the deadbolt key lock member 12 rotates the lock cam 74, which, in turn, contemporaneously shifts the crank arm of the lock cam 74, the second link 87 pivotally connected with the motor crank arm 76, the motor crank arm 76, the first link 83 pivotally connected with the motor crank arm 76 and the inner end of deadbolt 80, and deadbolt 80 from the unlocked to the locked position. In the locked position, the deadbolt 80 engages the door strike recess 17 in the door strike 15, and positively prevents opening of the door. The deadbolt key lock 10 can be unlocked by rotating the deadbolt key 128 and the associated deadbolt key lock member 12 in the opposite direction. The deadbolt 80 can be similarly shifted between the locked and unlocked positions from the interior of the closure 3 by rotation of the interior lock knob 52.

The closure 3 can also be positively locked in place by actuation of touch pad 36. For instance, a numerical code may be programmed on the microchip or controller 45 at the time of manufacture of the lock assembly 1. The original code may be, as a nonlimiting example, a null-code, such as "1111." After purchase by the end-user, the code can be modified and customized to the end-users preference. Preferably, the code may be repeatedly changed as deemed appropriate by the end-user. Once the predetermined numerical code is entered into the buttons 37 of the touch pad 36, the controller 45 can receive a signal that the closure 3 is to be placed in the locked mode. The controller 45 can then open a switch to send electrical power to actuate the lock motor 86. Preferably, the rotation of the motor 86 is about 90 degrees or less, and more preferably less than 80 degrees, in either direction. Upon actuation of the lock motor 86, the lock motor 86 rotates the motor crank arm 76, e.g., clockwise, which shifts the first link 83 pivotally connected with the motor crank arm 76 and the inner end of deadbolt 80, and deadbolt 80 from the unlocked to the locked position. In the locked position, deadbolt 80 can engage the door strike recess 17 in the door strike 15, and positively prevent opening of the door. The crank arm 75 of the lock cam 74 and the second link 87, pivotally connected with the motor crank arm 76, are also placed in the locked position. The deadbolt 80 is unlocked by re-entry of the predetermined numerical code and subsequent rotation of the lock motor 86 counterclockwise.

As shown in FIGS. 4-6 and 7A-7B, the example controller 45 can be generally embodied in or incorporate features of a standard printed circuit board, as is known in the art, configured as described in more detail below. In addition to actuating the deadbolt 80 as described above, the controller 45 can be configured for other tasks, such as monitoring the state of battery charge. For instance, the controller 45 can be programmed using suitable processor-executable instructions to activate a warning indicator, such as a blinking illuminator behind the buttons 37 upon entry of the code or a light emitting diode (LED) telltale (not shown), upon the battery charge dropping below a predetermined level, advising the end-user that the batteries should be replaced.

In the event of an electrical problem with the lock assembly 1, it is contemplated that the deadbolt 80 can still be activated by the deadbolt key 128 or internal lock knob 52. That is, the deadbolt 80 can be similarly shifted between the locked and unlocked positions from the interior of the closure by rotation of interior lock knob 52 and from the exterior of the closure by rotation of the deadbolt key lock member 12.

In the preferred example, a computer input device in the form of a flat panel or surface divided into several, differently marked, touch-sensitive areas form a relatively large, illuminated touch pad 36 including buttons 37. An example touch pad 36 may be provided by HSS Touch Technology and developed by AlSentis® HSS™, which is capable of identifying when a surface touch occurs without using pre-determined capacitive thresholds. However, other capacitive touch technologies and mechanical buttons can be employed as the buttons 37 of the touch pad 36. In an example lock 1, the buttons 37 have a diameter of at least ½ inch, with black numerical indicia 38 against a white background. Other indicia can be used, such as letters and symbols. A sensor 64 is disposed on the controller 45 and extends to the external surface of the exterior housing plate 22 for determining the proximity of a hand of a user. Illuminators that illuminate the buttons 37 of the touch pad 36, such as but not limited to LEDs, are disposed beneath the buttons 37, which may be translucent.

Upon detection of the user's hand or other appendage or contact source, the controller 45 can activate the LEDs to backlight the numerical indicia 38 to facilitate entry of the code. Alternatively or additionally, the controller 45 may process the detected touch to perform other functions, such as for a one-touch unlocking operation as described in more detail below. After a predetermined period of non-use, the LEDs may be deactivated to conserve battery power. Alternatively or additionally, the illuminators may be actuated by touch or depression of any of the buttons 37, as is readily available using the example HSS Touch Technology.

Audible feedback may be provided to successfully indicate locking and unlocking functions. For example, audible features may also be used to: signal that the assembly is ready to accept new code by emitting three short beeps; signal that a new code is entered by emitting four short beeps; signal that an incorrect code was entered with one long beep; signal that the deadbolt 80 is locked or unlocked with two short beeps; signal that the deadbolt 80 failed to lock or unlock with one long beep; and signal low battery charge with one long beep after the lock/unlock beeps. The controller 45 may be programmed such that the assembly will cycle up to ten (or other number) more times once the low battery indication occurs. After this, the final electric function in a low battery condition preferably implements a protocol to prevent the electronic locking function.

The lock assembly 1 described herein may be adapted for operable connection with a remotely operated signaling device such as but not limited to a key fob (not shown) or another trusted device such as device 320, described in more detail below. In example operation, the controller 45 may be programmed to interface with a built-in receiver, e.g., a wireless receiver, to receive a signal from a remotely operated signaling device equipped with a transmitter to place the lock assembly 1 in the locked mode. In response to such a signal, the controller 45 then opens a switch to send electrical power to actuate the lock motor 86. Upon actuation of the lock motor 86, the lock motor 86 rotates the motor crank arm 76 clockwise, which shifts the first link 83 pivotally connected with motor crank arm 76 and the inner end 82 of deadbolt 80, and deadbolt 80 from the unlocked to the locked positions. The closure 3 may be unlocked in similar fashion.

Figure 4:
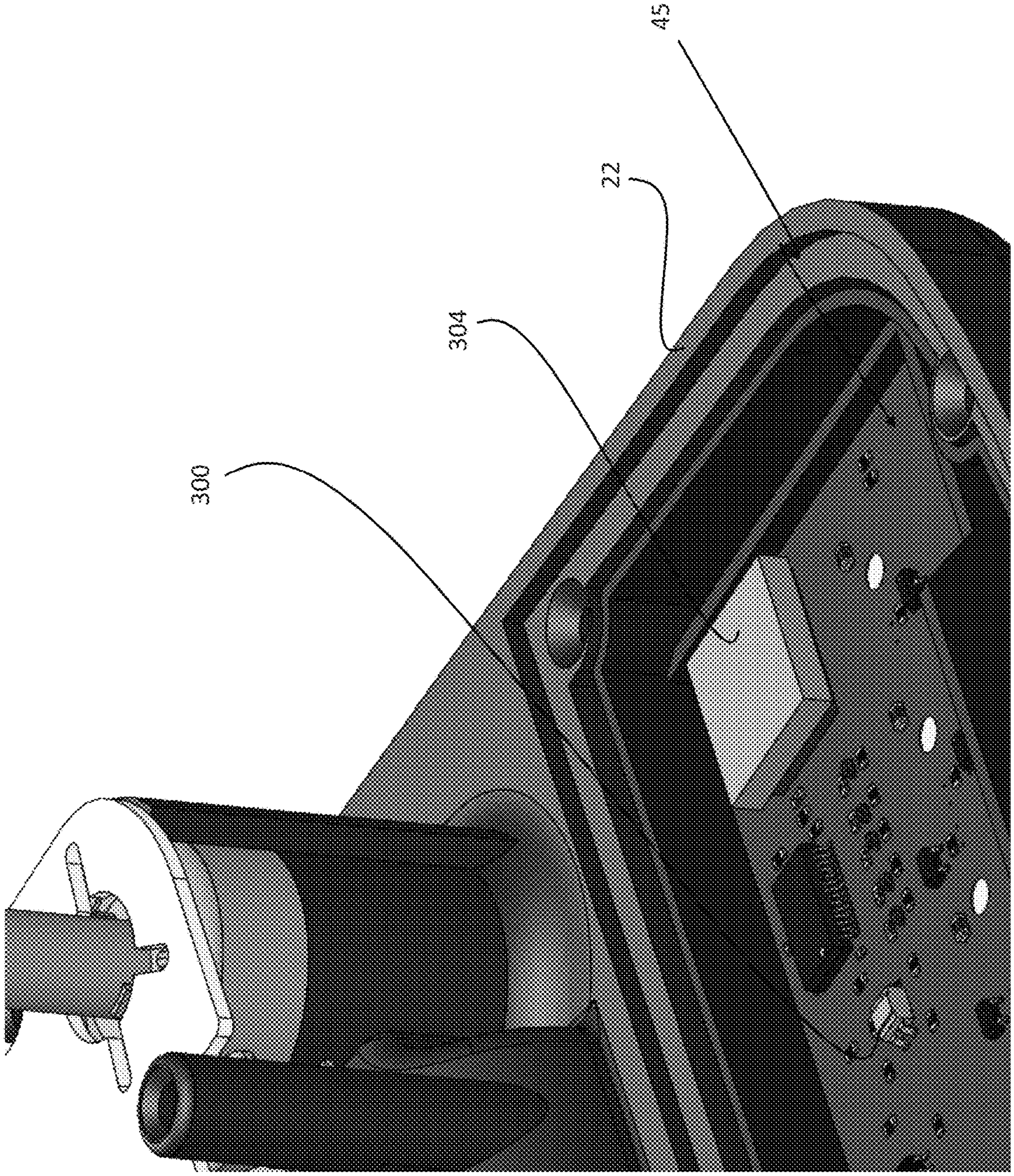
FIGS. 4-5 are perspective and exploded views of a portion of a circuit board providing a processor for the lock.
Figure 5:
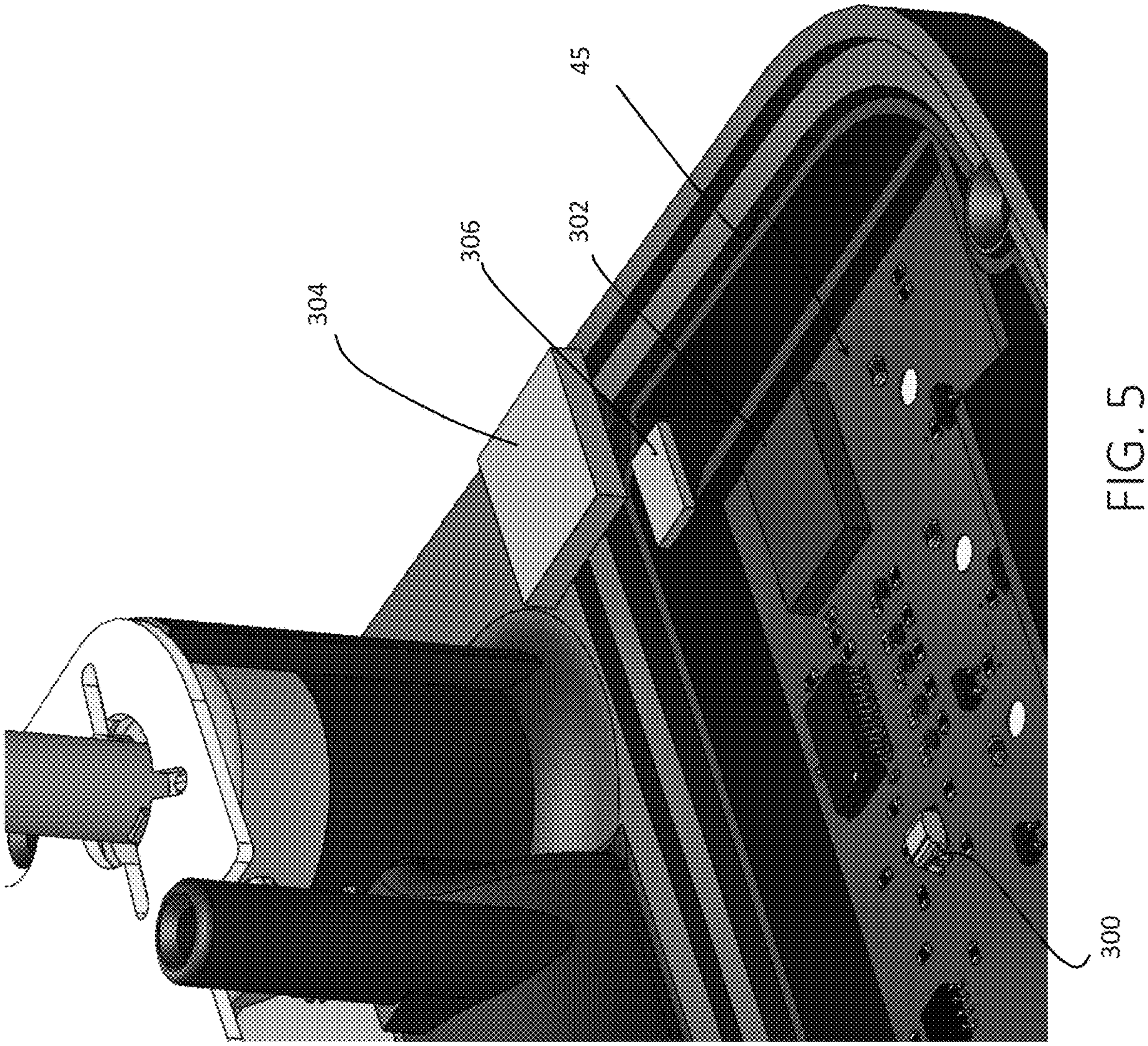
Figure 6:
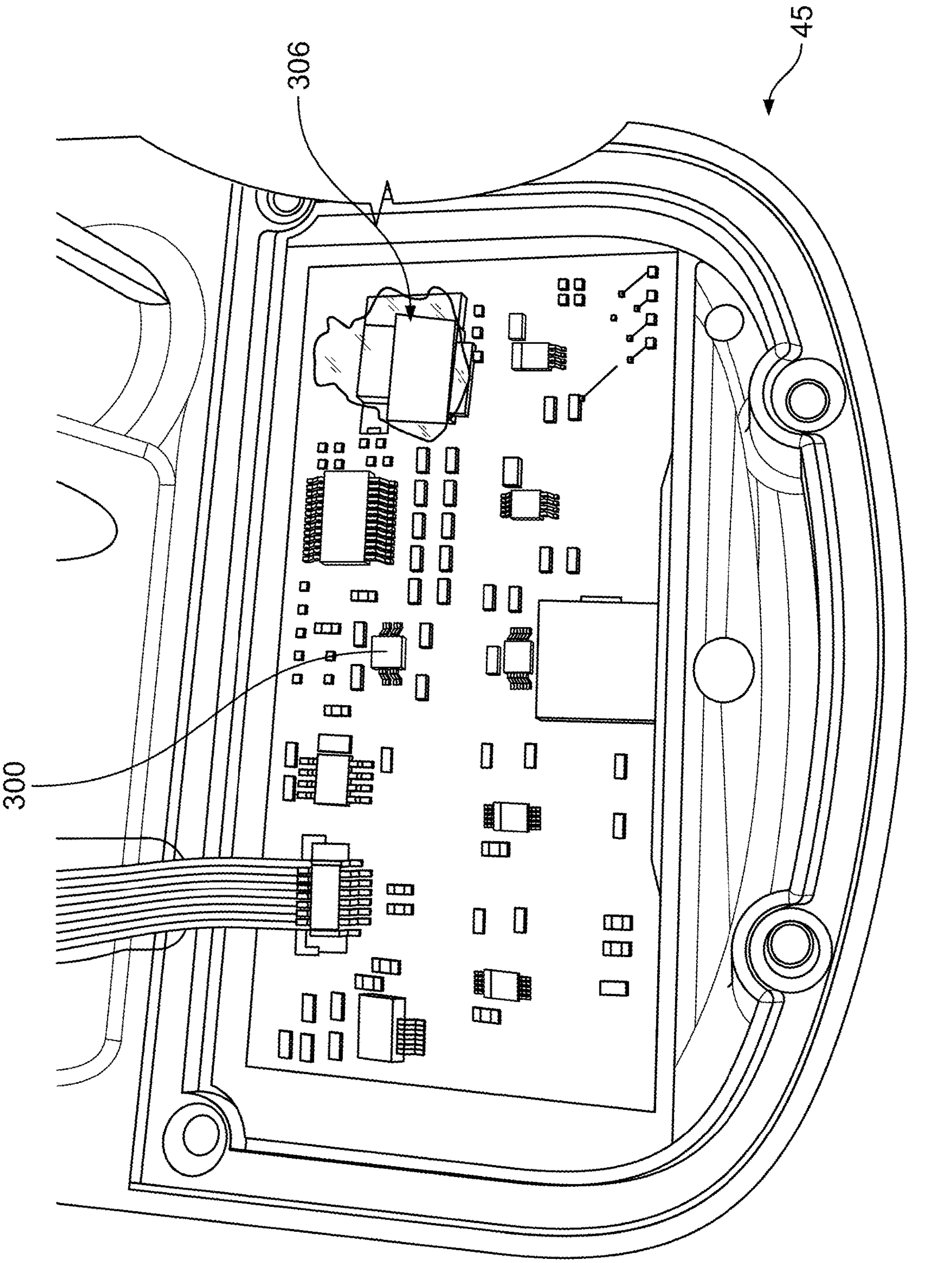
FIGS. 6 and 7A are top perspective views of a circuit board showing a spacer and radiofrequency shield.

FIG. 4 shows a portion of an example controller 45 for the lock 1, which can be included on an inside surface of the exterior housing plate 22. The controller 45 can be embodied in a printed circuit board, such as but not limited to a standard printed circuit board as is known in the art and may be further configured or adapted to provide features disclosed herein. The controller 45 can be powered by power sources such as batteries AA contained within a battery compartment and coupled through power lines.

The controller 45 can be programmed at the time of manufacture of the lock 1 or afterward (e.g., in the field) using processor-executable instructions that can be stored in or otherwise accessible to the controller to perform example methods herein, including but not limited to controlling an input device for the lock 1 for actuating or deactivating the lock to lock the closure 3 (e.g., opening a switch to send electrical power to actuate a lock motor 86, actuating a deadbolt 80), monitoring for trusted devices, authorizing trusted devices, actuating one or more indicators (such as LED 300), monitoring the state of battery or other power source charge, and interacting with the trusted devices according to example methods.

Referring to FIGS. 4-6 and 7A-7B, the controller 45 includes a wireless transceiver 302 (FIG. 5) including an antenna that is coupled to a processor such as a microcontroller or microprocessor disposed on the circuit board. An amplifier may be provided on the controller 45 for amplifying wireless signals. The processor generates control signals for controlling the transceiver 302 and receives and processes signals from the transceiver. Example wireless transceivers include onboard or integrated wireless modules, or other onboard or integrated transceivers used in the art for transmitting and receiving radiofrequency (RF signals), such as but not limited to Bluetooth, and Bluetooth LE. Transmitting and receiving components may be combined, e.g., integrated, or may be separate.

Figure 7A:
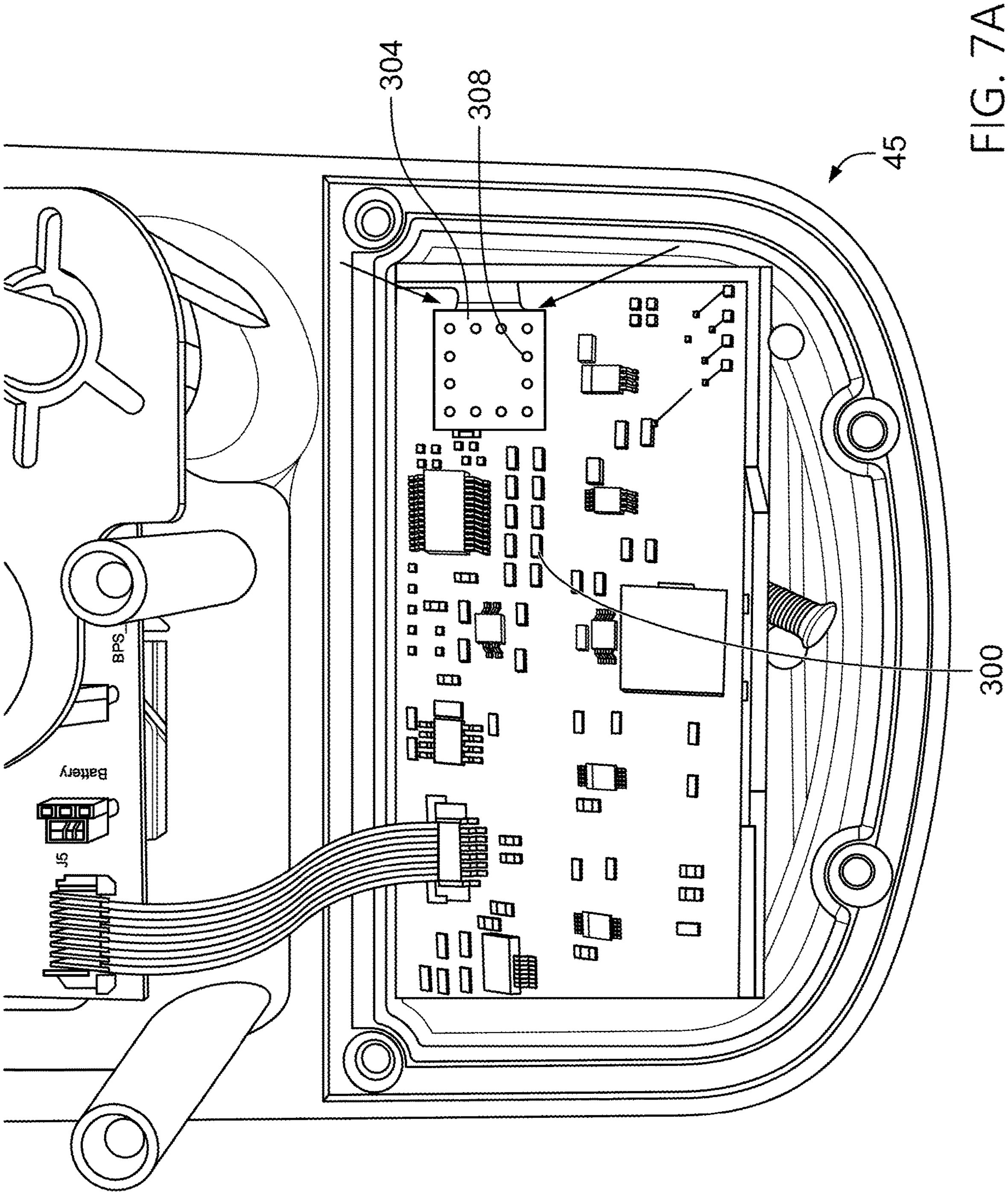

A radiofrequency shield (FIG. 7A) such as but not limited to a Faraday shield 304 may be provided for selectively shielding radiofrequency signals (RF) from and to the wireless antenna. A spacer 306 (FIG. 6) of a dielectric material, e.g., plastic, can be disposed between all or part of the antenna of the transceiver 302 (including, in some embodiments, the surface of the transceiver) and the Faraday shield 304. FIG. 7A shows an example configuration for the Faraday shield 304. The Faraday shield 304 can be made of a conductive material such as but not limited to tin, and is configured, such as by providing one or more positioned openings 308, to selectively block electromagnetic (EM) fields and thus more precisely controls the direction of RF signals received by and emitted from the antenna. The number, arrangement, and configuration of such openings can vary to provide selective shielding.

Figure 7B:
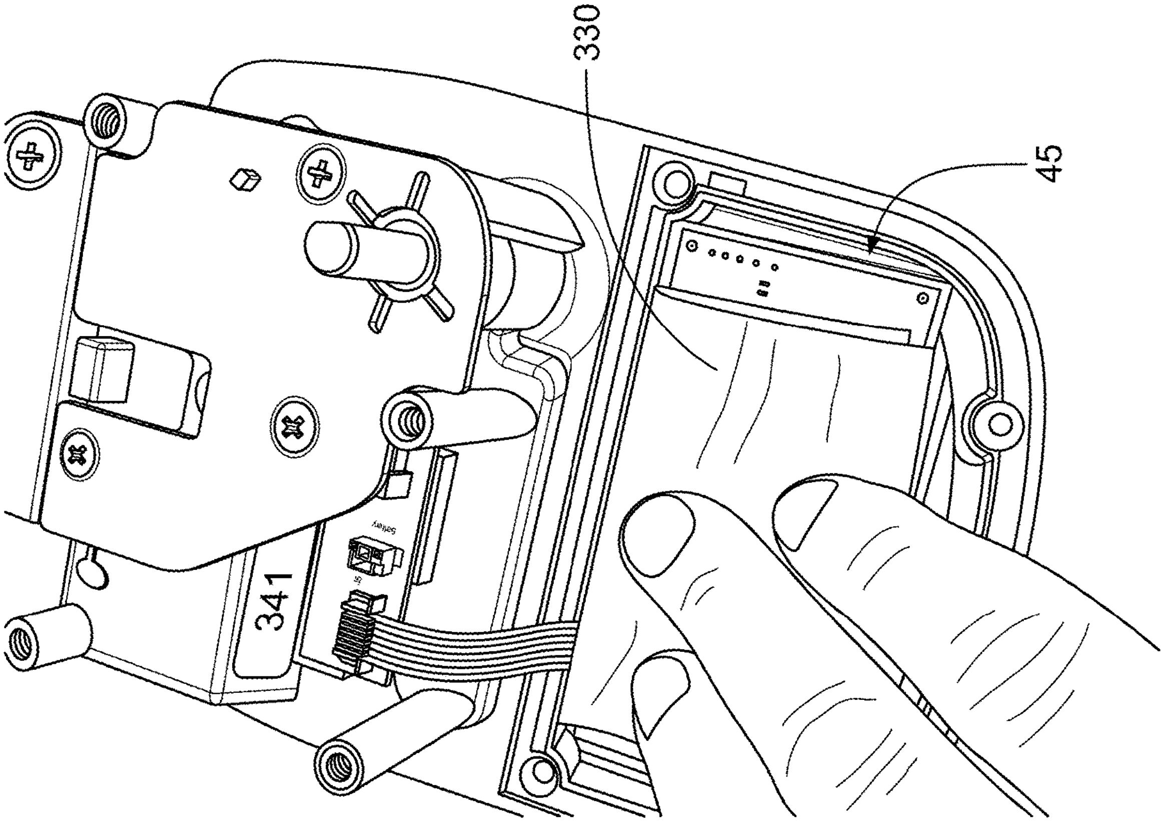
FIG. 7B is a perspective view of an attenuator placed over the radiofrequency shield.

As shown in FIG. 7B, to further attenuate the signal, an attenuator of electrostatic discharge (ESD) material, e.g., formed into one or more layers or pieces 330, may be included within the housing and disposed over the Faraday shield 304, e.g., over at least a portion of the circuit board surface including the Faraday shield. In combination with the Faraday shield 304, the attenuator 330 can lower the signal. Example ESD materials include but are not limited to those used for ESD bags or static shielding bags. The ESD material may be, but need not be, formed from folded layers as shown by example in FIG. 7B.

The signal attenuation provided by the Faraday shield 304 and the attenuator 330 in combination can help avoid an unintentional recognition by the lock 1 that a trusted portable device is in the selected proximity. By providing this signal attenuation, the trusted device can be more deliberately positioned in proximity to the lock 1 (e.g., by a user approaching the lock while the trusted device is carried in the user's hand, clothing (e.g., pocket), bag, purse, etc.), and in response the lock 1 can signal, e.g., via the indicator 300 that the lock recognizes the trusted device so that the user can deactivate the lock easily, such as by touching the touch pad 36, keypad 37, or button on the lock.

Figure 8:
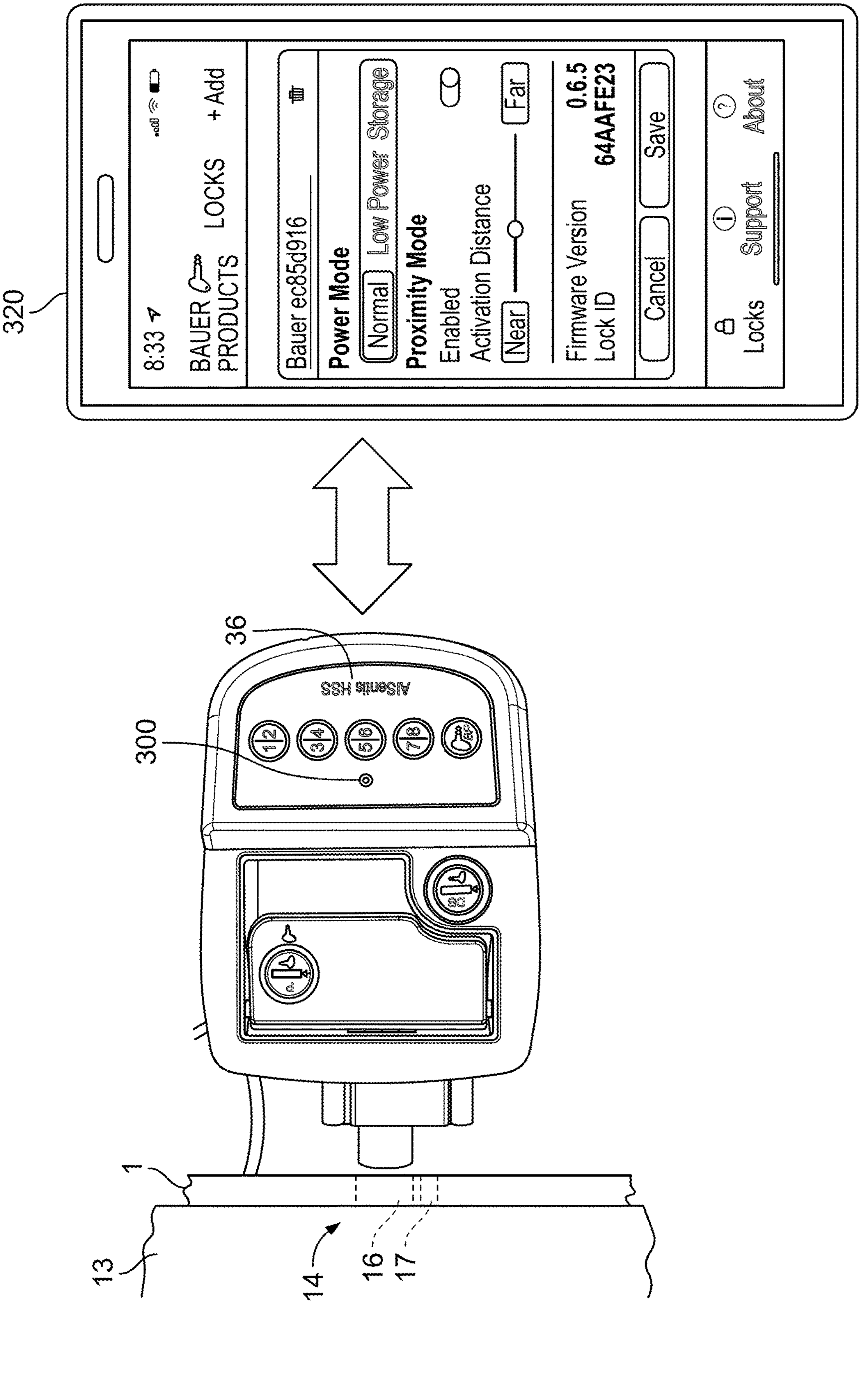
FIG. 8 shows an example interface between a lock and a trusted device.

Referring to FIG. 8, the controller 45 is configured, e.g., programmed using processor-executable instructions, to interface with and/or operate the transceiver 302 to receive signals from and transmit signals to a remote (wirelessly connected) portable device 320 that itself is equipped with a transceiver for receiving data and command signals, and optionally for sending response data or status/alert signals. The controller 45 is further configured for performing example methods as provided herein.

The remote portable device 320 can be embodied in, for instance, a smartphone as shown in FIG. 8, but may alternatively be a wearable device, tablet computer, VR/AR device, laptop, or other processor-based portable device on which an application (app) can be provided (e.g., installed, stored in memory as processor-executable instructions) for performing example methods herein. Remote portable devices may operate individually or in combination to perform example methods. Reference herein to smartphone functions will likewise be applicable to other functions of other remote portable devices, as will be appreciated by an artisan.

The remote portable device 320 is preferably associated with, e.g., assigned, embedded with, etc., a device identifier (ID) that is stored in a memory of, or otherwise accessible to, the controller 45 so that the remote portable device is considered a trusted device by the lock. The device ID is preferably unique to each remote portable device 320, or at least each trusted device. The lock 1 may itself be associated with a unique ID (a Lock ID) that in turn can be associated with the device IDs of trusted devices, and accordingly may be considered a trusted lock for a particular trusted device. This association may be stored in the controller 45, in a remote storage, in a central storage, in the remote portable device 320, or elsewhere, in any combination. Individual locks 1 may be associated with multiple remote portable devices 320 providing trusted devices, and individual remote portable devices may be associated with multiple locks providing trusted locks.

The device ID may be created in any suitable manner (random, hashed, selected, etc.) and assigned by a user or by a central entity, for instance. In other examples, the device ID may be a unique ID already associated with computing or networking devices (such as a MAC address, Unique Device ID (UDID), IMEI, IMSI, etc.). Reference herein to a stored device ID is intended to refer to device IDs that are either stored in the controller 45 itself or that otherwise are accessible to the controller during operation. The stored ID can be provided to the controller 45, for instance, at the factory, provided during installation, and/or provided after installation such as by a central computing unit that updates stored IDs, by the remote portable device 320, or by another device that interfaces with the controller. Stored IDs can be stored as data via one or more tables, by hard coding, or by any other suitable format.

A remote portable device 320 that is trusted by the lock 1 for performing locking or unlocking operations, e.g., by having a device ID that is known to the controller 45 to be authorized for controlling the lock 1, or at least activating or deactivating the lock, is referred to herein as a trusted device or alternatively a securely paired device. This pairing may be distinct from, for instance, more general pairing for communication methods or protocols such as Bluetooth or Bluetooth LE pairing in devices such as earbuds, appliances, etc. (e.g., where a device in a vicinity may pair) in that a device ID for the remote portable device 320 is registered with the lock 1 to provide a trusted device, though both standard Bluetooth or Bluetooth LE pairing and device ID association can be required or used. It is also possible that the device ID used for standard communication pairing and device ID association is the same ID, while in other embodiments, these IDs are distinct. In a nonlimiting example pairing operation, a personal code may be entered on the keypad 37 of the lock 1 followed by an additional input (e.g., touching two or more buttons, a submit or enter command, etc.). This puts the lock 1 in pairing mode and prevents unsecured devices from being paired. Preferably, the pairing also is encrypted.

It is possible that remote portable devices 320 can have different trust levels associated with a device ID. For instance, some trusted devices may be permitted to activate and deactivate the lock and set various functions related thereto but may not be able to add or remove device IDs or receive or transmit history data or a subset of the same, while other trusted devices may be permitted to do so. In some example embodiments, the controller 45 stores each remote portable device's unique ID to track trusted devices.

Figure 9:
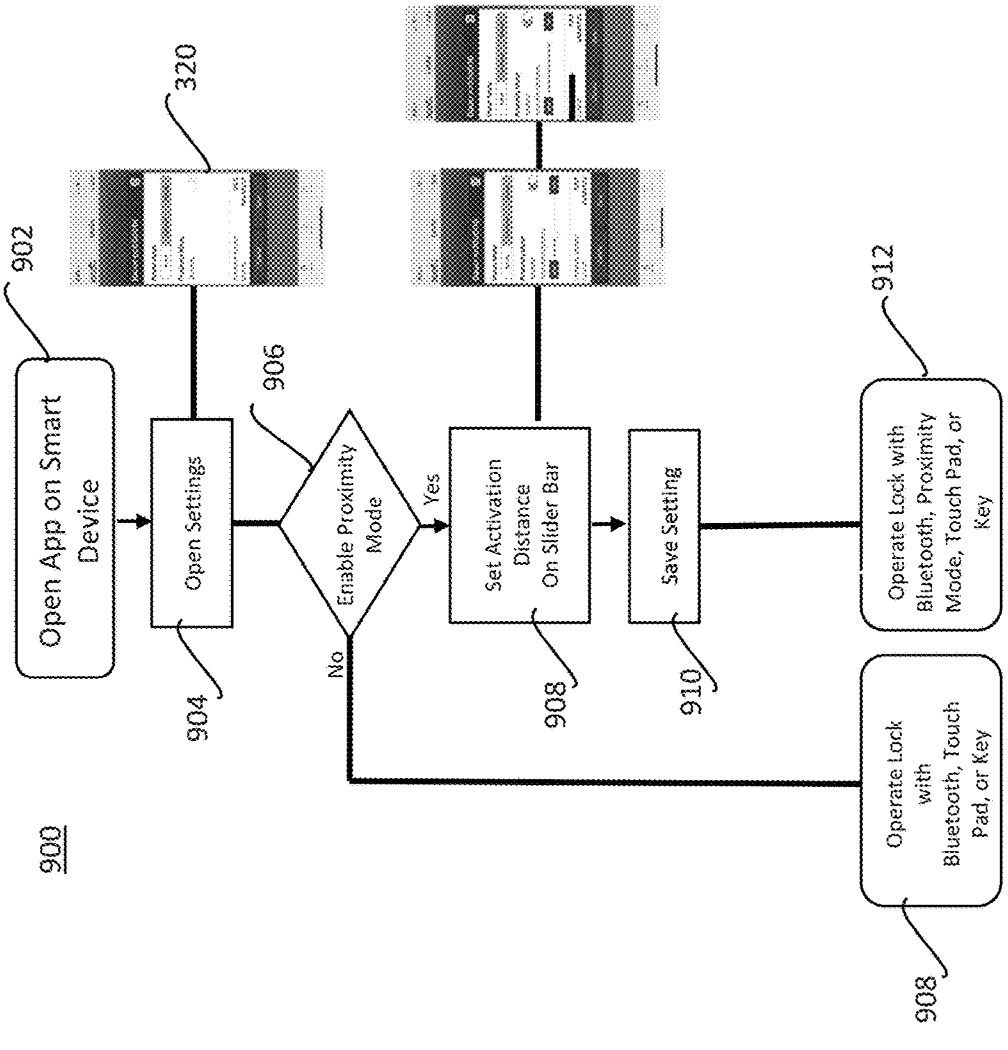
FIG. 9 shows an example lock controlling operation using a trusted device executing an application (app) provided thereon.
Figure 10:
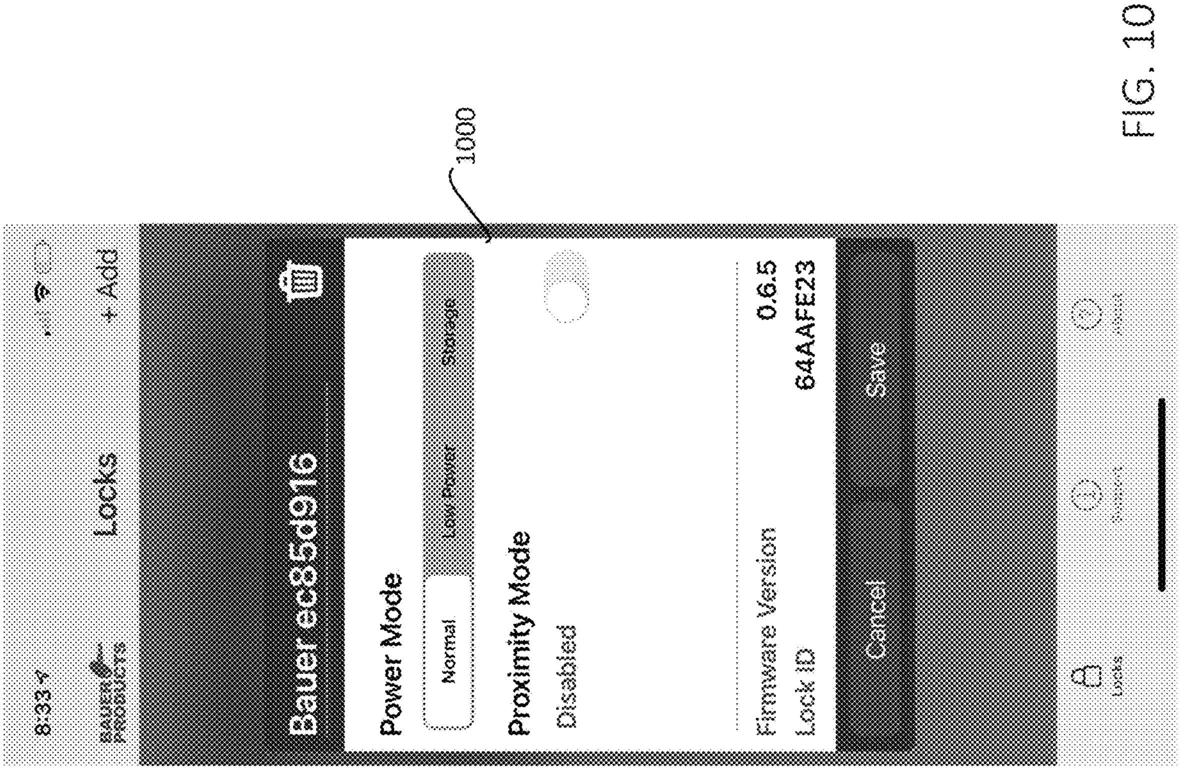
FIGS. 10-12 are example app screenshots for configuring settings.

FIG. 9 shows an example method 900 for operating the lock using a remote portable device 320 (here, a smartphone) as will be appreciated in the art, having a processor, memory, and touchscreen interface, and including an application (app). The app, which may be executed in an operating system for the remote portable device 320 as will be appreciated, is opened by a user at 902. A settings interface, e.g., screen, for configuring interface settings for a lock is opened at 904. FIG. 10 shows an example settings screen 1000, including power mode settings for the lock 1 (normal, low power, storage) and a proximity mode selector. Power mode settings can be provided to selectively extend battery life for the lock 1. The app firmware version and a lock ID for a lock are shown in the example settings screen 1000. Cancel and save selections are also provided.

If the user does not enable proximity mode at 906, the lock 1 optionally may be operated with one or more interfaces at 908 such as Bluetooth operation, touch pad operation, or using a key, such as described above. On the other hand, if the user enables proximity mode at 906, e.g., using the selector on example settings screen 1000, the app screen allows a user to configure or adjust the proximity mode at 908, e.g., to set an activation distance by displaying a tool such as a slider as shown in configuration screens 1100, 1200. Configuring or adjusting the proximity mode at 908 can include adjusting a close field boundary in which a Device will detect the presence of a securely paired (or trusted) device. "Close field" as referred to herein is a defined area (e.g., by the user via the app) in which the lock 1 can sense or detect the presence of a remote portable device 320 that was securely paired to the lock. In this way, the lock 1 can differentiate non-paired and paired phones within the defined close field area. Typically, for a communications method such as Bluetooth or Bluetooth LE, the maximum range or area would be determined by the remote portable device's and the lock's Bluetooth Modules, including antennae capability and specifications.

Figure 11:
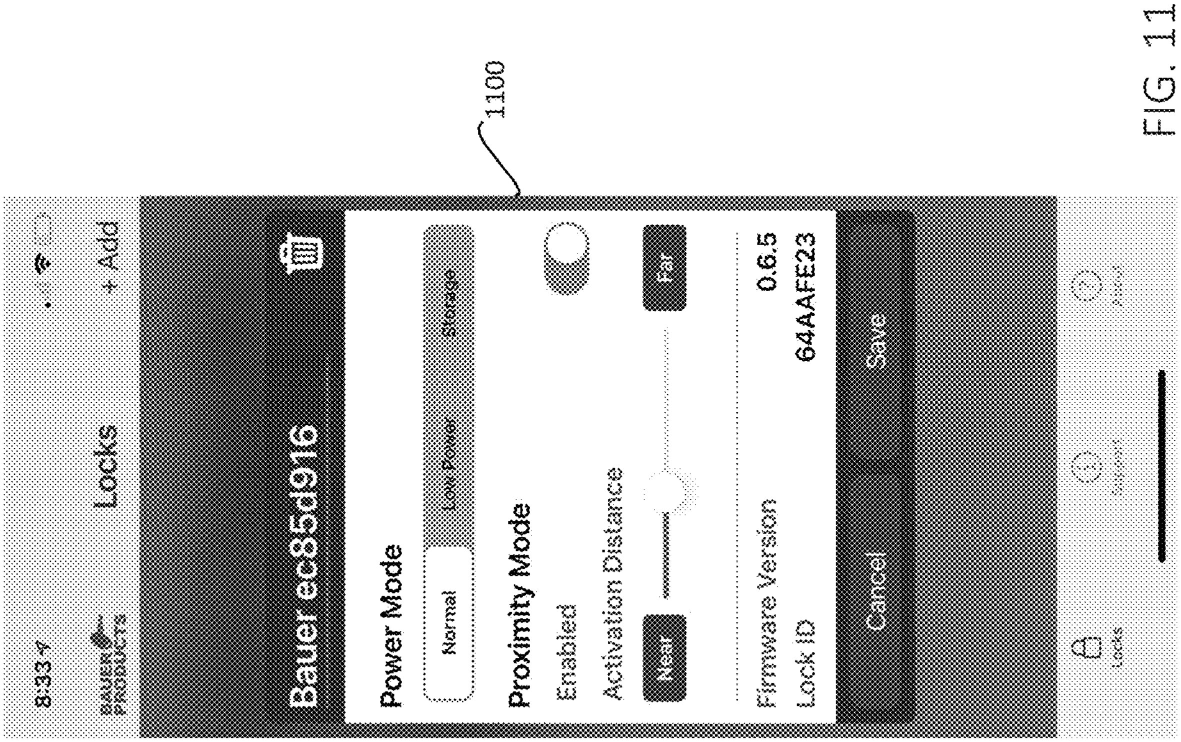
Figure 12:
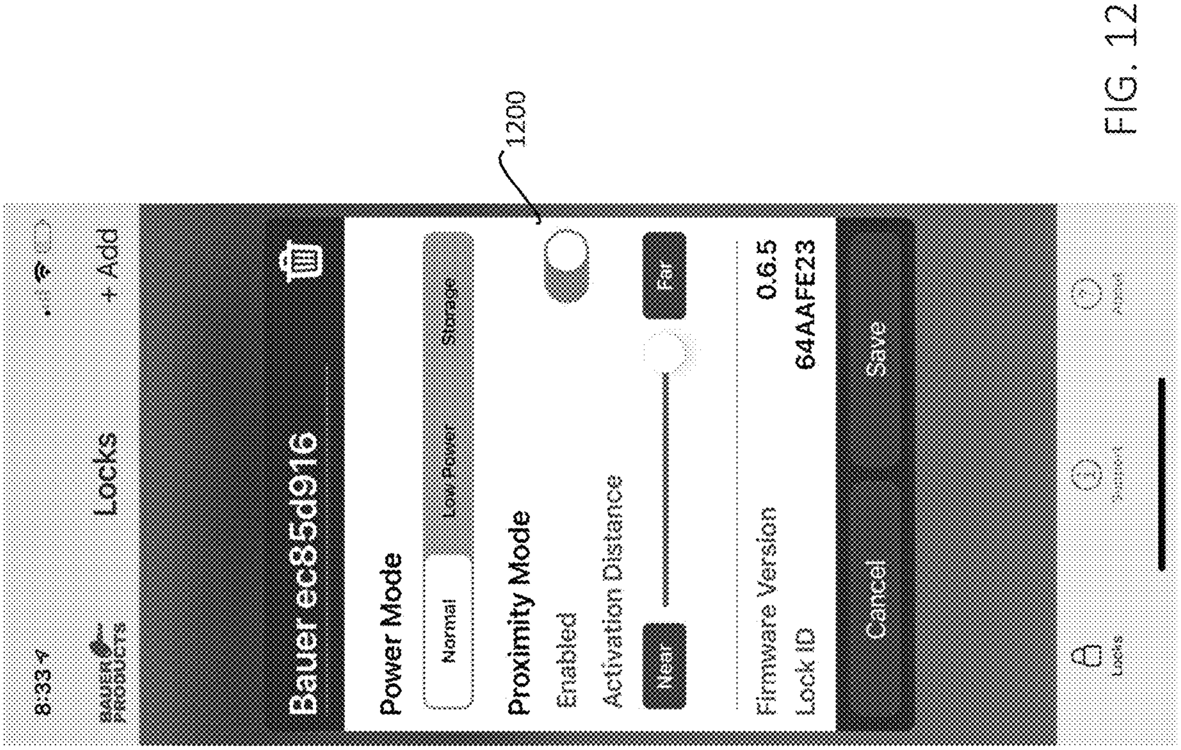

In embodiments, the proximity mode is configured or adjusted by configuring an activation distance in the app. This activation distance is typically set by signal strength between the portable device 320 and the lock 1 (e.g., their respective antennas). For instance, the screens 1100, 1200 in FIGS. 11-12 shows a slider for setting an activation distance between near (FIG. 11) and far (FIG. 12). "Near" and "far" in this example can be relative, as portable devices 320 may have different levels of wireless (e.g., Bluetooth) sensitivity due to different antennas, Bluetooth modules, etc., even for the same antenna or wireless module in the lock 1. As a nonlimiting example, for a first portable device, a "far" setting may be, say, 120 ft., while for a second portable device, the "far" setting may be 60 ft. In locks having an RF shield such as the example Faraday shield, the direction of the close field can be more precisely controlled, and thus the adjusted activation distance can also be more precisely controlled. In response to a save selection, e.g., via the user selecting a save icon, the adjusted proximity settings are saved at 910.

In this way, the zone within which the lock allows a particular trusted device (which zone can be defined, for instance, by signal strength between the lock and the trusted device) to be used in a proximity mode is individually configurable/definable by the user, e.g., by using an application (app) executed by a processor and memory in the trusted device. In embodiments, each trusted device can define its own close field boundary, and each trusted device paired to the lock can thus be associated with a selectable zone boundary around the lock. During operation, the device 320 would not be recognized for proximity mode operation outside the limits of the set zone.

The lock 1 can then be operated, e.g., activated and deactivated, using the enabled proximity mode at 912, which mode may be in addition to (as shown) or an alternative to other unlocking modes, such as Bluetooth, touch pad, key, etc., at 908 Generally, to activate/deactivate the lock 1 using the proximity mode, a trusted device, e.g., a remote portable device 320 securely paired with the lock, is in the selected zone (close field range) of the lock, and proximity mode is activated by the trusted device using the app. If these conditions are met, an unlocking/locking command signal can then be provided from, for instance, a user interfacing with a portion of the lock 1, such as by touching a button or a surface on the input device, e.g., the lock's keypad 37 or touch pad 36, and/or from the trusted device that is within the range, such as in response to a user selection via the app. In response to this received unlocking/locking command the lock 1 deactivates/activates. The interface can be a one-touch lock/unlock in some embodiments, so that the lock 1 is activated or deactivated in response to a single received touch input by the keypad or touch pad 36, buttons 37, or other input device that occurs while proximity mode is active.

Figure 13:
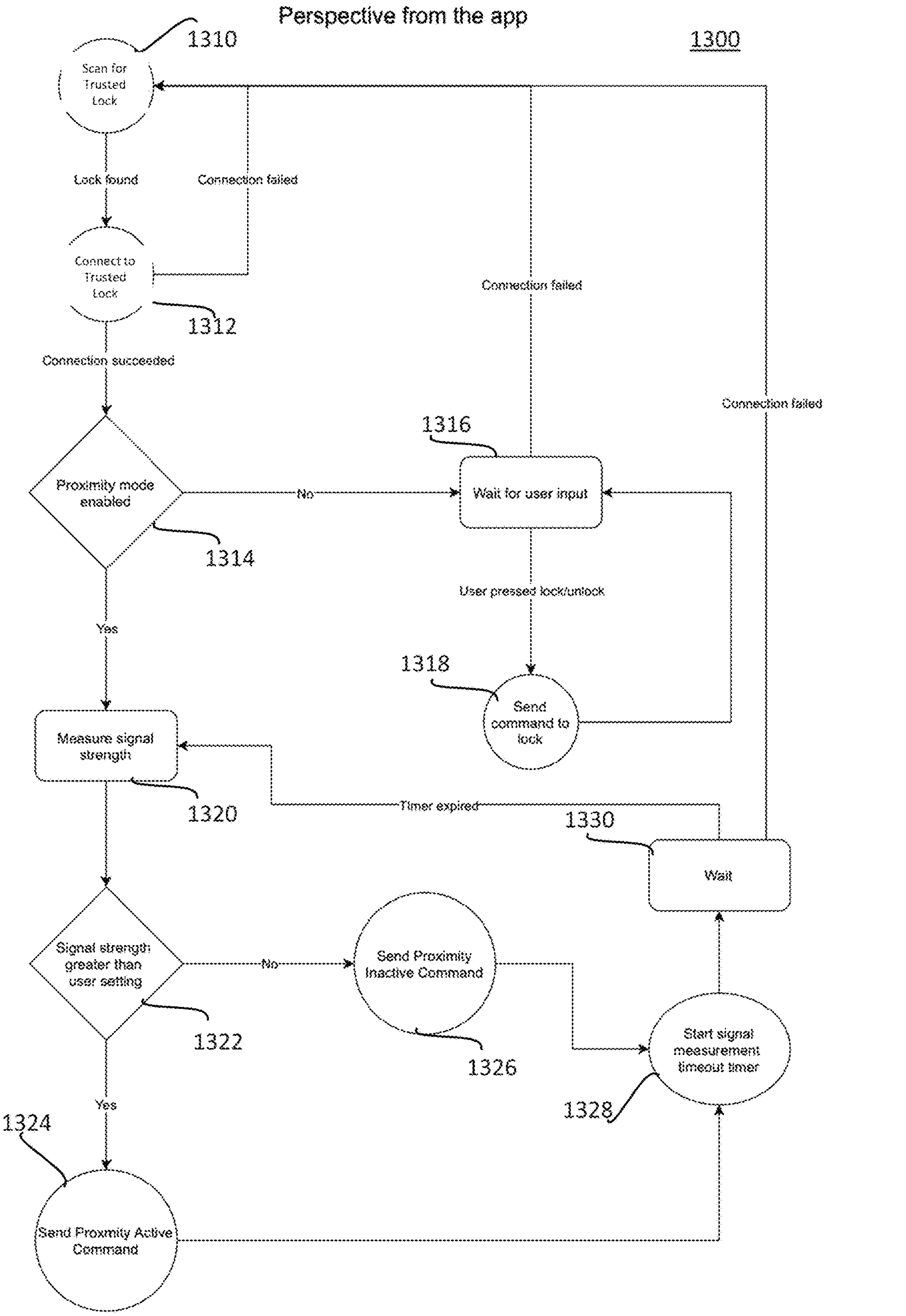
FIG. 13 is an example lock monitoring operation from a trusted device (app) perspective.
Figure 14:
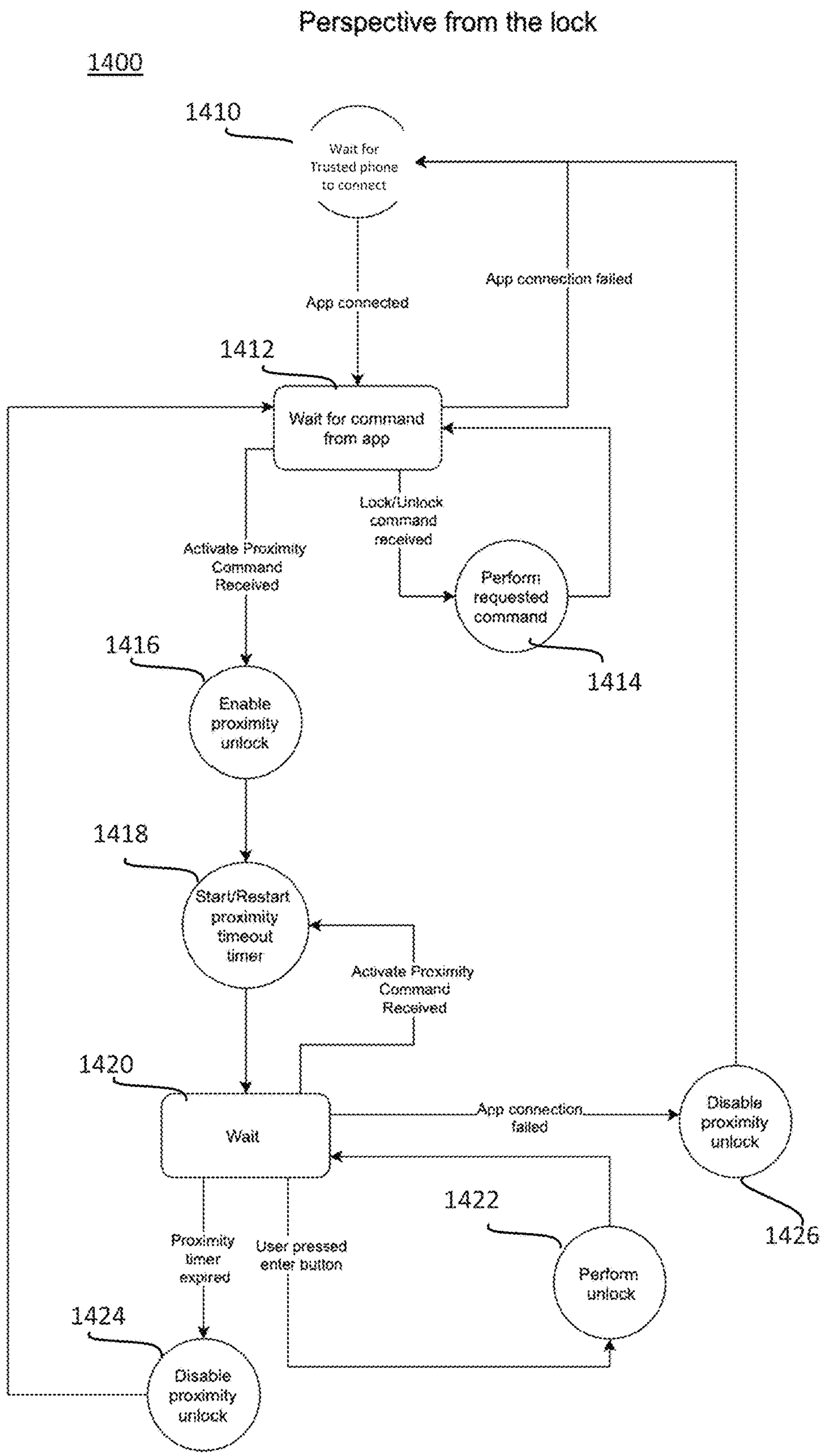
FIG. 14 is an example lock monitoring operation from a lock perspective.

An example monitoring and locking/unlocking method 1300 performed by the trusted device 320 via the app is shown in FIG. 13, and an example monitoring and locking/unlocking method 1400 performed by the lock 1 is shown in FIG. 14. Referring to FIG. 13, the executed app causes at 1310 the trusted device 320 to scan for a trusted device such as the (trusted) lock 1 (the trusted device may be associated with multiple lock IDs via the app, as explained above). In example embodiments, a device ID match is required in order to authorize performance of all operations. The lock 1 accordingly will look to match device IDs. If a (trusted) lock is found, the trusted device is connected to the (trusted) lock at 1312, e.g., via Bluetooth, Bluetooth LE, or other suitable wireless communication protocols as may be appreciated by an artisan. If the connection fails, the trusted device 320 returns to scanning for trusted locks at 1310.

If the connection succeeds, the app determines at 1314 whether proximity mode has been enabled. Proximity mode can be enabled once the trusted device 320 wirelessly connects to the lock 1. If proximity mode is not enabled, the app waits for user input at 1316. If a lock/unlock command is received, e.g., the user presses a lock/unlock button such as via the app, the lock/unlock command is sent to the lock at 1318, and the app then returns to wait for user input at 1316. If the connection fails during this time, the trusted device 320 returns to scanning for trusted locks at 1310.

If proximity mode is enabled at 1314, the app measures at 1320 the signal strength of a wireless signal received from the lock 1, e.g., using signals generated from the transceiver provided on the portable device 320. If the measured signal strength is greater than (or in some embodiments, greater than or equal to) a user setting providing (or processed to provide) a threshold for the activation distance, it is determined at 1322 that the trusted device 320 is within the selected close field of the lock 1. A proximity active command is then sent to the lock 1 at 1324. An example proximity active command is a secure message sent to the lock 1 indicating that proximity mode has been activated. In this way, when a trusted device 320 (i.e., a paired remote portable device having an ID that is associated with one stored in the lock) comes in the defined close field boundary, a secure message can be sent to the lock 1 indicating that the particular trusted device is inside the close field boundary. Proximity mode is activated in response, and the lock 1 can activate the indicator 300, e.g., illuminating the LED, causing the LED to blink, etc.

The presence of the trusted device 320 can then be used by the lock 1 while in the proximity mode to enable or disable certain functions. For example, once the trusted device 320 is detected inside the close field, the lock 1 can unlock with a simple user action, such as the simple press of a button or a surface on the lock's keypad 37 or touch pad 36, e.g., a one-touch unlock, or an icon (soft button).

Figure 15:
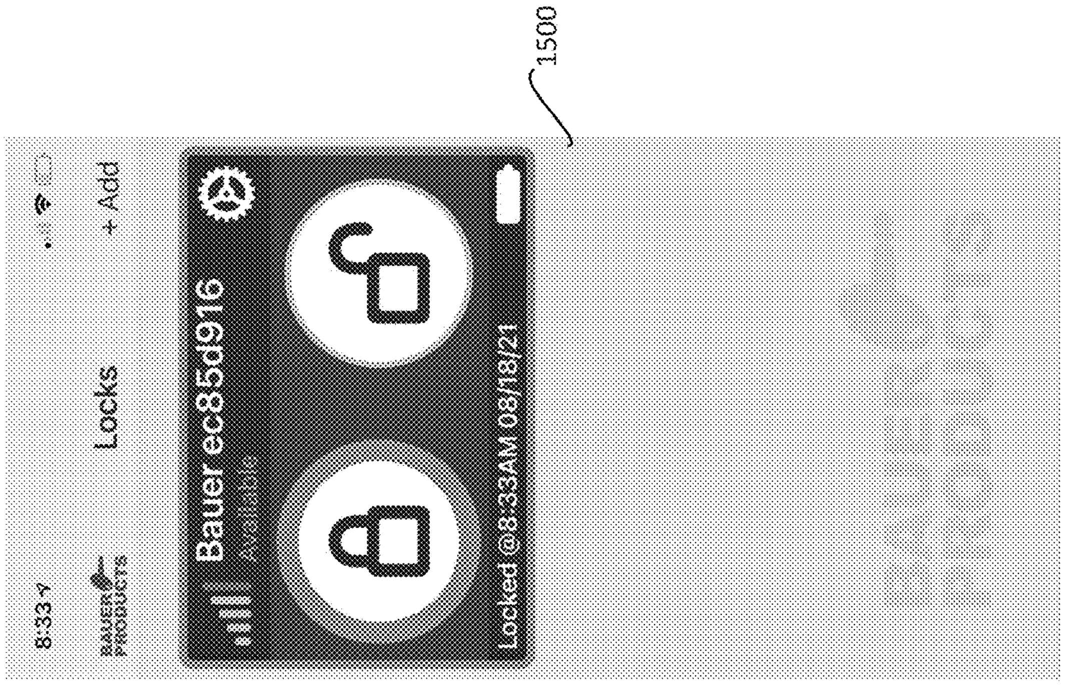
FIGS. 15-16 are example app screenshots for inputting locking/unlocking commands.
Figure 16:
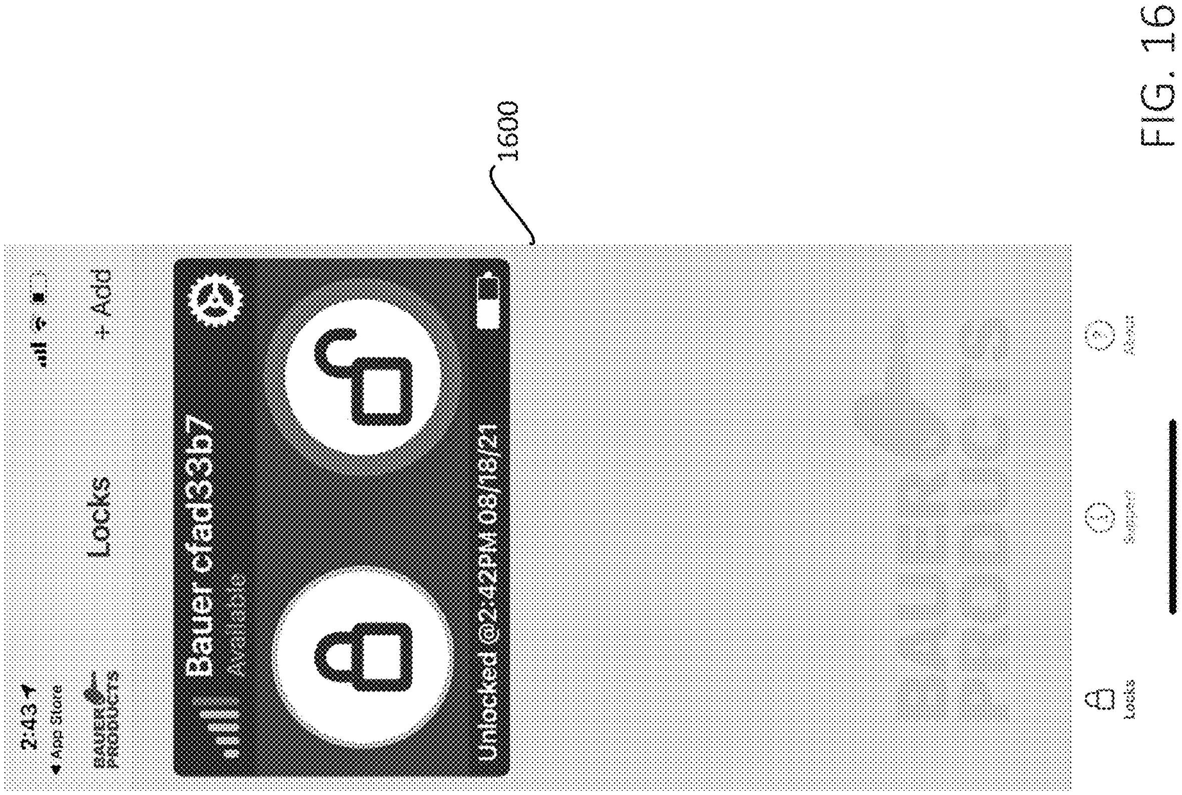

FIGS. 15-16 shows an example user interface 1500, 1600 in the app at two respective stages. The user interface 1500, 1600 can be used for sending commands for remotely locking and unlocking respective locks via Bluetooth, and for viewing status of the locks. The example interfaces 1500, 1600 include an upper status bar showing the lock ID, and an indicator for whether the lock is available to the portable device; that is, whether the trusted device 320 is paired to the lock 1 and within range. A lower status bar shows a recent history for operation of the lock, and an available battery percentage for the lock. The interfaces 1500, 1600 further include lock and unlock command button icons, with lock status (locked (FIG. 15) or unlocked (FIG. 16)) being viewable by a ring surrounding the appropriate icon.

Returning to FIG. 13, if the app does not detect at 1322 that the signal strength is greater (or equal to) that associated with the selected activation distance, a proximity inactive command can be sent to the lock at 1326. Proximity inactive commands can include, for instance, a command to disable the indicator 300 and deactivate proximity mode. If proximity mode is enabled but the desired signal strength is not identified, the lock 1 will not be able to be operate using an authorized proximity mode operation, such as a one touch operation. The indicator light 300 in an example method will not illuminate (e.g., blink) as the signal strength is not in the range set on the trusted device 320.

A signal measurement timeout timer is then started at 1328, and after a waiting period at 1330 for a time (which may be selectable or fixed), the timer expires, and signal strength is again measured at 1320 to determine whether the trusted device is still within the close field. If connection fails while the measurement timeout timer is running at 1330, the trusted device again returns to scanning for trusted locks at 1310.

Referring now to FIG. 14, showing an example monitoring operation from a perspective of the lock 1, the lock waits at 1410 for the trusted device 320 to connect, e.g., via the executed app. If the trusted device 320 (e.g., the app) is connected, the lock 1 waits for a command from the app at 1412. The command can be, for instance, a lock/unlock command outside of proximity mode, or a command to activate proximity mode. If the app connection fails, the lock 1 returns to waiting for the app to connect at 1410.

If the received command is a lock/unlock command outside of proximity mode, the lock 1 performs the requested command at 1414, and waits for additional commands from the app at 1412. If the app connection fails, the lock returns to waiting for the app to connect at 1410.

If the lock 1 receives an activate proximity command, the controller 45 can also activate the indicator 300 (e.g., switches on the LED, which can blink or remain steady) to signal to the user and/or the trusted device 320 that the lock can now receive proximity mode commands such as but not limited to a one-touch locking/unlocking command. The lock 1 enables proximity unlock/locking commands at 1416, such as but not limited to a lock or unlock command issued by touching the keypad (touch pad) 36, buttons 37, etc. The example indicator 300 allows the user to set or receive feedback regarding the proximity mode distance for their particular device 320. It provides a visual representation for the distance and allows the user to know the lock 1 is locked and can be unlocked by, e.g., touching a button on the keypad 37 or touching the touch pad 36.

Having enabled proximity unlock at 1416, the lock 1 starts a proximity timeout timer at 1418 and waits for additional commands at 1420. While the proximity timeout timer is running, if a locking or unlocking command such as via a touch input signal (e.g., a single touch input, an enter button, etc.) is received by the lock 1, the lock deactivates or activates the lock accordingly at 1422, and waits for further commands at 1420. If a new activate proximity command is received from the trusted device 320, the proximity timer is restarted at 1418. However, if the proximity timer expires, and no appropriate proximity mode command is received, the lock 1 can disable proximity unlock mode at 1424, deactivate the indicator 300 (e.g., switch off the LED), and wait for further commands from the app at 1412. In this way, the lock 1 detects when the trusted device 320 has left the left the close field boundary or otherwise lost communications, and disables proximity functions inside the lock. If, during the waiting time, the trusted device (e.g., app) connection fails, the proximity unlock mode is also disabled at 1426, the indicator 300 can be deactivated, and the lock 1 can again wait for a connection from a trusted device 320 at 1410.

Figure 17:
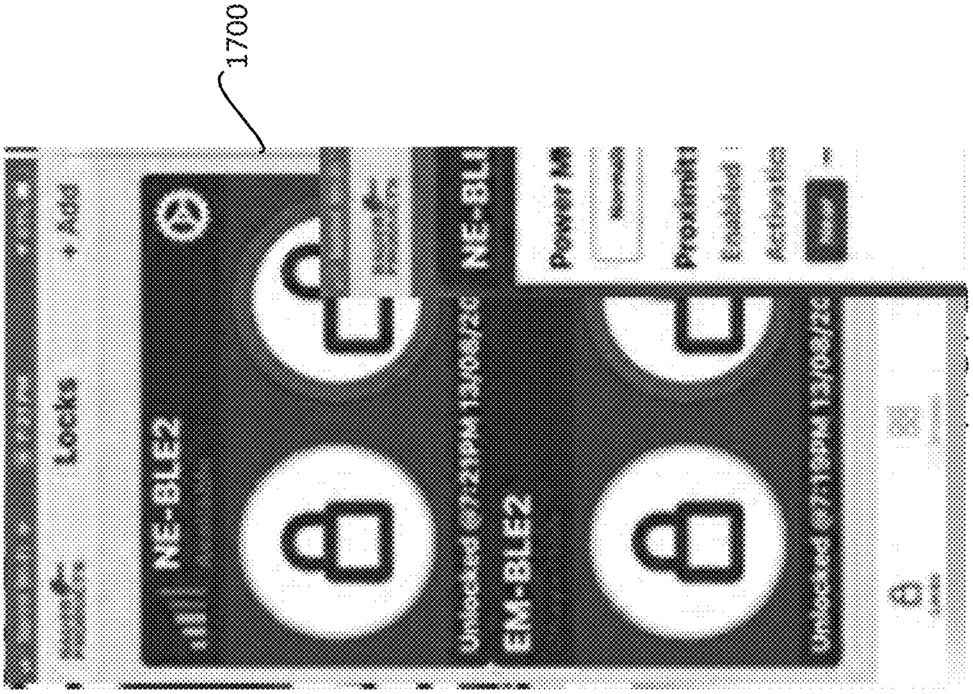
FIGS. 17-18 are example app screenshots showing an unlocking/locking history and status for two paired locks.
Figure 18:
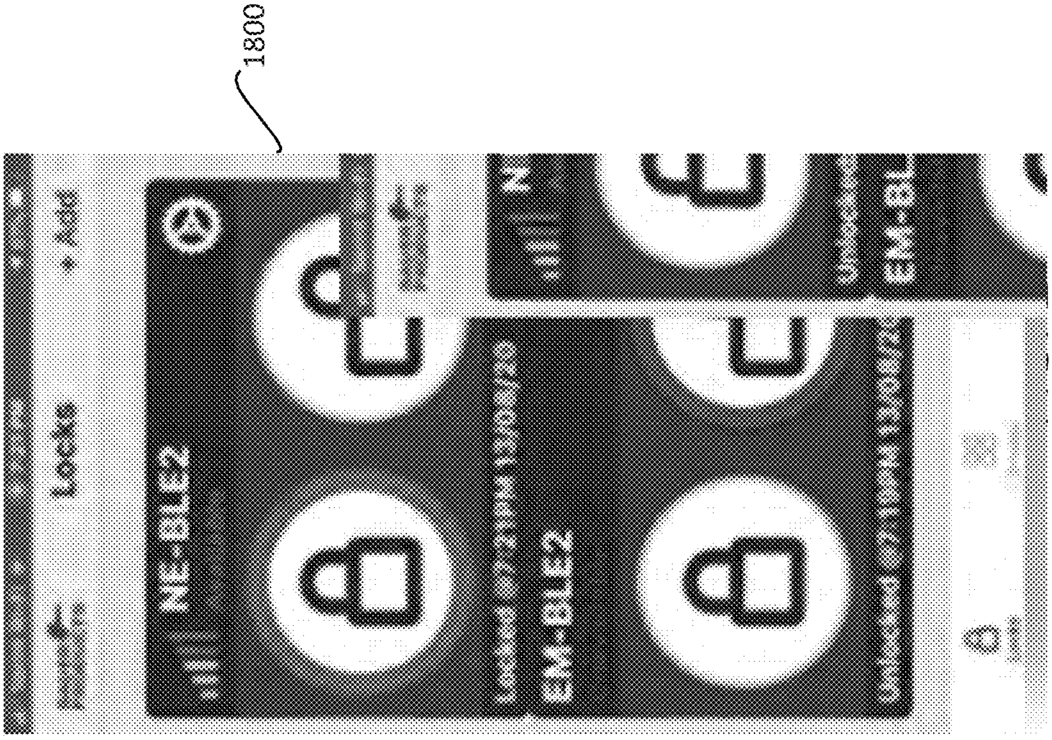

The trusted device 320 and/or the lock 1 may store in their memory data corresponding to one or more aspects of locking/unlocking history or status for one or more locks and/or devices. FIGS. 17-18 show portions of example history and status screens for two locks at two states. In the history and status screen, the first (upper half) lock is available while the second (lower half) lock is unavailable. In the history and status screen 1700 in FIG. 17, the first lock is shown as currently unlocked, with the most recent action (unlocking) occurring at 7:21 PM. In the history and status screen 1800 in FIG. 18, the same lock has been locked at 7:21 PM.

The locking and unlocking history for one or more trusted devices 320 (e.g., by device ID) and/or locks 1 (e.g., by lock ID) can be stored, in any combination, in trusted devices, locks, remote or central processing locations, or any combination. Other data that may be stored and associated with locks and/or trusted device include, but are not limited to, battery status of locks; connection time by device ID, proximity activated time by device ID, number of dropped/failed connections; unauthorized locking/unlocking attempts; and others.

While a particular embodiment of the present lock 1 has been described herein, it will be appreciated by those skilled in the art that changes and modifications may be made thereto without departing from the invention in its broader aspects and as set forth in the following claims.

Embodiments of the present invention provide, among other things, a method for operating a lock, the method comprising: receiving a wireless command from a trusted device in a proximity range of the lock to enable a proximity mode, wherein the proximity range is selectable by a user of the trusted device via an application; enabling the proximity mode; while the proximity mode is enabled, receiving a command to activate or deactivate the lock; and activating or deactivating the lock in response to the receiving activating or deactivating command. In addition to any of the above features in this paragraph, the method may further comprise: activating an indicator in further response to receiving the command to enable the proximity mode. In addition to any of the above features in this paragraph, the indicator may comprise a light. In addition to any of the above features in this paragraph, the indicator may comprise a light-emitting diode (LED). In addition to any of the above features in this paragraph, the proximity range may be selected based on a distance, wherein the distance is measuring using a strength of a signal sent from the lock to the trusted device. In addition to any of the above features in this paragraph, the signal may be transmitted to the trusted device from a radiofrequency antenna and through a radiofrequency shield configured to attenuate the signal. In addition to any of the above features in this paragraph, the trusted device may be associated with a device ID that is stored in the lock. In addition to any of the above features in this paragraph, the trusted device may be a smartphone. In addition to any of the above features in this paragraph, the received command to activate or deactivate the lock may be received via a touch-based input device disposed on the lock. In addition to any of the above features in this paragraph, the touch-based input device may comprise a touch pad, a keypad, a button, and/or an icon. In addition to any of the above features in this paragraph, the received input may be provided via a single touch.

Additional embodiments of the present invention provide, among other things, a lock assembly (lock) adapted for mounting adjacent an associated closure of the type that can be shifted between an open position and a closed position, the lock assembly comprising: a housing; an external handle mounted in an exterior portion of the housing for actuation between a first position and a second position; a latch plunger operably connected with the external handle and configured such that when the external handle is in the first position, the latch plunger is in a latched position, wherein the closure cannot be unintentionally shifted from the closed position, and when the external handle is in the second position, the latch plunger is in an unlatched position, wherein the closure is free to be shifted from the closed position to the open position; a lock cam rotatably mounted in the housing having a locked and unlocked position; a motor; a motor cam clutch operably coupled with the motor and operably interposed between the lock cam and the motor; a deadbolt lock movably mounted in the housing and operatively coupled with each of the lock cam and the motor for shifting between a locked position, wherein the closure is positively retained in the closed position, and an unlocked position, wherein the closure is free to be shifted between the open and closed positions; and an input device operatively connected with the motor, whereby actuation of the input device actuates the motor and contemporaneously shifts the deadbolt lock between the locked and unlocked positions; wherein the input device comprises a processor that is configured to perform a method according to the preceding paragraph. In addition to any of the above features in this paragraph, the input device may further comprise: a wireless transceiver having an antenna; and a radiofrequency (RF) shield disposed with respect to the antenna to selectively block RF signals from the antenna. In addition to any of the above features in this paragraph, the lock assembly may further comprise: an indicator in communication with the input device that indicates when the proximity mode is enabled. In addition to any of the above features in this paragraph, the indicator may comprise a light. In addition to any of the above features in this paragraph, the indicator may comprise a light-emitting diode (LED). In addition to any of the above features in this paragraph, the input device may further comprise a touchpad, a keypad, a button, or an icon that is responsive to a touch input. Additional embodiments of the present invention provide, among other things, a system for locking a closure, the system comprising: a lock assembly according to any of the above features in this paragraph; and one or more portable devices, each portable device comprising: a processor; a non-transitory memory; and executable instructions stored in the memory for causing the portable device to perform methods provided herein.

Additional embodiments of the present invention provide, among other things, a lock as disclosed herein. Additional embodiments of the present invention provide, among other things, a method for operating a lock as shown in FIG. 14.

Additional embodiments of the present invention provide, among other things, a portable device as disclosed herein. Additional embodiments of the present invention provide, among other things, a method for operating a portable device as shown in FIG. 13.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Also, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor, or processors, with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as modules. The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those of ordinary skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, circuits, and process steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present invention.

Any of the above aspects and embodiments can be combined with any other aspect or embodiment as disclosed here in the Summary, Figures and/or Detailed Description sections.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. It will be readily understood that the aspects of the present disclosure, as generally described herein, and illustrated in the figures, can be arranged, substituted, combined, separated, and designed in a wide variety of different configurations, all of which are explicitly contemplated herein. In other words, the described embodiments are not mutually exclusive, and permutations of one or more embodiments with one another remain within the scope of this disclosure. Other embodiments may be utilized, and other changes may be made, without departing from the scope of the subject matter presented herein.

Any of the above aspects and embodiments can be combined with any other aspect or embodiment as disclosed here in the Summary, Figures and/or Detailed Description sections, except where such combinations would be infeasible as will be appreciated by an artisan.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and."

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12%, 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for operating a lock, the method comprising:

receiving a wireless command from a trusted device in a proximity range of the lock to enable a proximity mode, wherein the proximity range is selectable by a user of the trusted device via an application;

enabling the proximity mode;

while the proximity mode is enabled, receiving a command to activate or deactivate the lock; and activating or deactivating the lock in response to the receiving activating or deactivating command;

wherein the received command to activate or deactivate the lock is received via a touch-based input device disposed on the lock.

2. The method of claim 1, further comprising:

activating an indicator in further response to receiving the command to enable the proximity mode.

3. The method of claim 2, wherein the indicator comprises a light.

4. The method of claim 2, wherein the indicator comprises a light-emitting diode (LED).

5. The method of claim 1, wherein the proximity range is selected based on a distance, wherein the distance is measured using a strength of a signal sent from the lock to the trusted device.

6. The method of claim 1, wherein the trusted device is associated with a device ID that is stored in the lock.

7. The method of claim 1, wherein the trusted device is a smartphone.

8. The method of claim 1, wherein the touch-based input device comprises a touch pad, a keypad, a button, and/or an icon; and wherein the received input is a single touch.

9. A method for operating a lock, the method comprising:

receiving a wireless command from a trusted device in a proximity range of the lock to enable a proximity mode, wherein the proximity range is selectable by a user of the trusted device via an application;

enabling the proximity mode; while the proximity mode is enabled, receiving a command to activate or deactivate the lock; and activating or deactivating the lock in response to the receiving activating or deactivating command;

wherein the proximity range is selected based on a distance, wherein the distance is measured using a strength of a signal sent from the lock to the trusted device; and wherein the signal is transmitted to the trusted device from a radiofrequency antenna and through a radiofrequency shield configured to attenuate the signal.

10. The method of claim 9, wherein the received command to activate or deactivate the lock is received via a touch-based input device disposed on the lock.

11. A lock adapted for mounting adjacent an associated closure of the type that can be shifted between an open position and a closed position, the lock comprising:

a housing;

an external handle mounted in an exterior portion of the housing for actuation between a first position and a second position;

a latch plunger operably connected with the external handle and configured such that when the external handle is in the first position, the latch plunger is in a latched position, wherein the closure cannot be unintentionally shifted from the closed position, and when the external handle is in the second position, the latch plunger is in an unlatched position, wherein the closure is free to be shifted from the closed position to the open position;

a lock cam rotatably mounted in the housing having a locked and unlocked position;

a motor;

a motor cam clutch operably coupled with the motor and operably interposed between the lock cam and the motor;

a deadbolt lock movably mounted in the housing and operatively coupled with each of the lock cam and the motor for shifting between a locked position, wherein the closure is positively retained in the closed position, and an unlocked position, wherein the closure is free to be shifted between the open and closed positions; and an input device operatively connected with the motor, whereby actuation of the input device actuates the motor and contemporaneously shifts the deadbolt lock between the locked and unlocked positions;

wherein the input device comprises a processor that is configured via executable instructions to perform a method comprising:

receiving a wireless command from a trusted device in a proximity range of the lock to enable a proximity mode, wherein the proximity range is selectable by a user of the trusted device via an application;

enabling the proximity mode;

while the proximity mode is enabled, receiving a command to activate or deactivate the lock; and activating or deactivating the lock in response to the receiving activating or deactivating command.

12. The lock of claim 11, wherein the input device further comprises:

a wireless transceiver having an antenna; and a radiofrequency (RF) shield disposed with respect to the antenna to selectively block RF signals from the antenna.

13. The lock of claim 11, further comprising:

an indicator in communication with the input device that indicates when the proximity mode is enabled.

14. The lock of claim 13, wherein the indicator comprises a light.

15. The lock of claim 13, wherein the indicator comprises a light-emitting diode (LED).

16. The lock of claim 11, wherein the input device further comprises a touchpad, a keypad, a button, or an icon that is responsive to a touch input.

17. A system for locking a closure, the system comprising:

a lock adapted for mounting adjacent the closure, the lock being actuatable via an input device to shift between locked and unlocked positions, the input device comprising a processor that is configured via executable instructions to perform a method comprising:

receiving a wireless command from a trusted device in a proximity range of the lock to enable a proximity mode, wherein the proximity range is selectable by a user of the trusted device via an application;

enabling the proximity mode;

while the proximity mode is enabled, receiving a command to activate or deactivate the lock; and activating or deactivating the lock in response to the receiving activating or deactivating command;

the system further comprising one or more trusted devices, each of the one or more trusted devices comprising:

a processor;

a non-transitory memory; and executable instructions stored in the memory for causing the trusted device to perform a method comprising:

connecting wirelessly to the lock;

sending the wireless command to the lock to cause the lock to enable the proximity mode.

18. The system of claim 17, wherein each of the one or more trusted devices is configured to send the wireless command to the lock to cause the lock to enable the proximity mode if the trusted device detects that the portable device is within the proximity range.

19. The system of claim 18, wherein each of the one or more trusted devices is configured to detect that the trusted device is within the proximity range using a measured signal strength of a signal received from the lock.

20. The system of claim 17, wherein each of the one or more trusted devices comprises a smartphone configured to execute the application.

* * * * *